(12) United States Patent
Schieltz et al.

(10) Patent No.: US 11,134,200 B2
(45) Date of Patent: Sep. 28, 2021

(54) TWO AXIS PAN TILT CAMERA SYSTEM CONFIGURED TO MAINTAIN A LEVEL IMAGE WHEN WALL OR CEILING MOUNTED

(71) Applicant: Johnson Controls Tyco IP Holdings LLP, Milwaukee, WI (US)

(72) Inventors: Steven W. Schieltz, Boca Raton, FL (US); Channing Everet Miller, Fort Lauderdale, FL (US); Patrick Siu, Tyngsborough, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 53 days.

(21) Appl. No.: 15/959,860

(22) Filed: Apr. 23, 2018

(65) Prior Publication Data
US 2019/0327420 A1 Oct. 24, 2019

(51) Int. Cl.
*H04N 5/232* (2006.01)
*G08B 13/196* (2006.01)
(Continued)

(52) U.S. Cl.
CPC ....... *H04N 5/23299* (2018.08); *H04N 5/2251* (2013.01)

(58) Field of Classification Search
CPC ............. H04N 5/2251; H04N 5/2252; H04N 5/23299; H04N 7/18; F16M 11/04;
(Continued)

(56) References Cited

U.S. PATENT DOCUMENTS

| 5,028,997 A * | 7/1991 | Elberbaum | ............ F16M 11/10 348/143 |
| 7,425,101 B2 * | 9/2008 | Cheng | ............ G03B 17/00 348/143 |

(Continued)

FOREIGN PATENT DOCUMENTS

| EP | 1 788 800 A1 | 5/2007 |
| JP | 2001346074 | * 12/2001 |

(Continued)

OTHER PUBLICATIONS

European Search Report for European Application No. 19170575.5, dated Aug. 9, 2019, 13 pages.

*Primary Examiner* — Lin Ye
*Assistant Examiner* — Chriss S Yoder, III
(74) *Attorney, Agent, or Firm* — Foley & Lardner LLP

(57) ABSTRACT

A camera system is disclosed that enables movement in the pan and tilt directions while maintaining a level image when wall or ceiling mounted. The camera system includes one or more motors to pan or tilt the camera, but does not include a motor to rotate the camera image. The camera system can have a wall-mounted or ceiling-mounted configuration, with the pan axis of the camera in the vertical direction. In this way, movements in the pan or tilt direction of the camera maintain the level image, thereby avoiding any need to rotate the camera. For example, the camera system may include a support body and a camera subsystem, which includes the camera. The position of the support body relative to the camera may be different in the wall-mounted configuration versus the ceiling-mounted configuration; however, in both configurations, the camera can have its pan axis in the vertical direction.

18 Claims, 48 Drawing Sheets

(51) Int. Cl.
*F16M 11/20* (2006.01)
*F16M 13/02* (2006.01)
*H04N 5/225* (2006.01)

(58) Field of Classification Search
CPC .... F16M 13/02; G03B 17/02; G08B 13/1963;
G08B 13/19632; G08B 13/19617
See application file for complete search history.

(56) References Cited

U.S. PATENT DOCUMENTS

| | | | |
|---|---|---|---|
| 7,614,804 B2* | 11/2009 | Kim | G03B 17/561 |
| | | | 348/373 |
| 9,458,963 B1* | 10/2016 | Choi | F16M 11/041 |
| 2008/0002026 A1 | 1/2008 | Okamura et al. | |
| 2008/0158355 A1 | 7/2008 | Jodan et al. | |
| 2009/0290023 A1 | 11/2009 | Lefort et al. | |
| 2013/0229569 A1* | 9/2013 | Bevirt | H04N 5/23296 |
| | | | 348/373 |
| 2015/0304532 A1* | 10/2015 | Bart | H04N 5/23296 |
| | | | 348/373 |
| 2020/0124949 A1* | 4/2020 | Zhang | F16M 11/105 |

FOREIGN PATENT DOCUMENTS

| | | | |
|---|---|---|---|
| JP | 2009088838 | * | 4/2009 |
| WO | WO-99/44472 A1 | | 9/1999 |
| WO | WO-2005/124932 A2 | | 12/2005 |
| WO | WO-2009/040994 A1 | | 4/2009 |

* cited by examiner

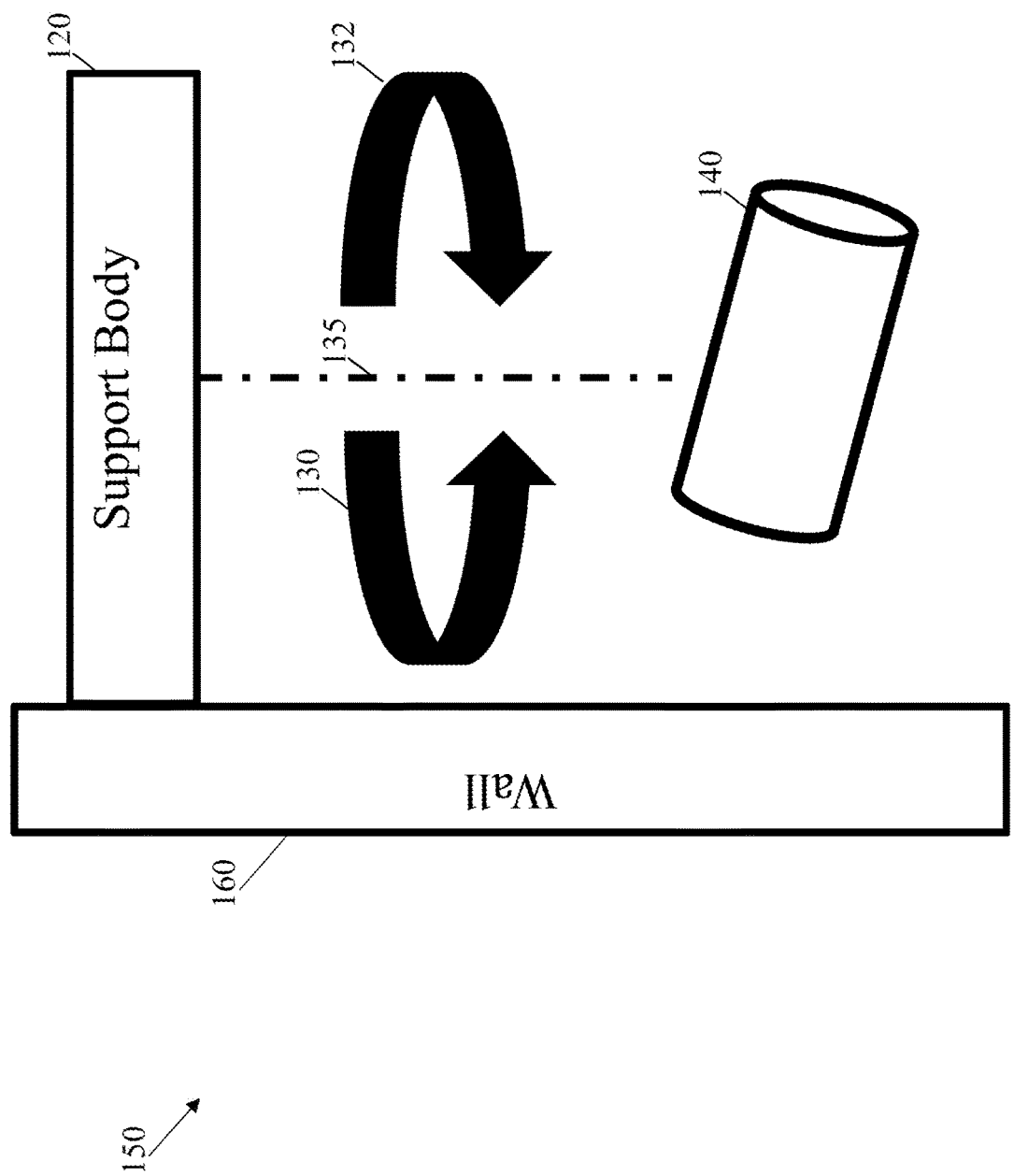

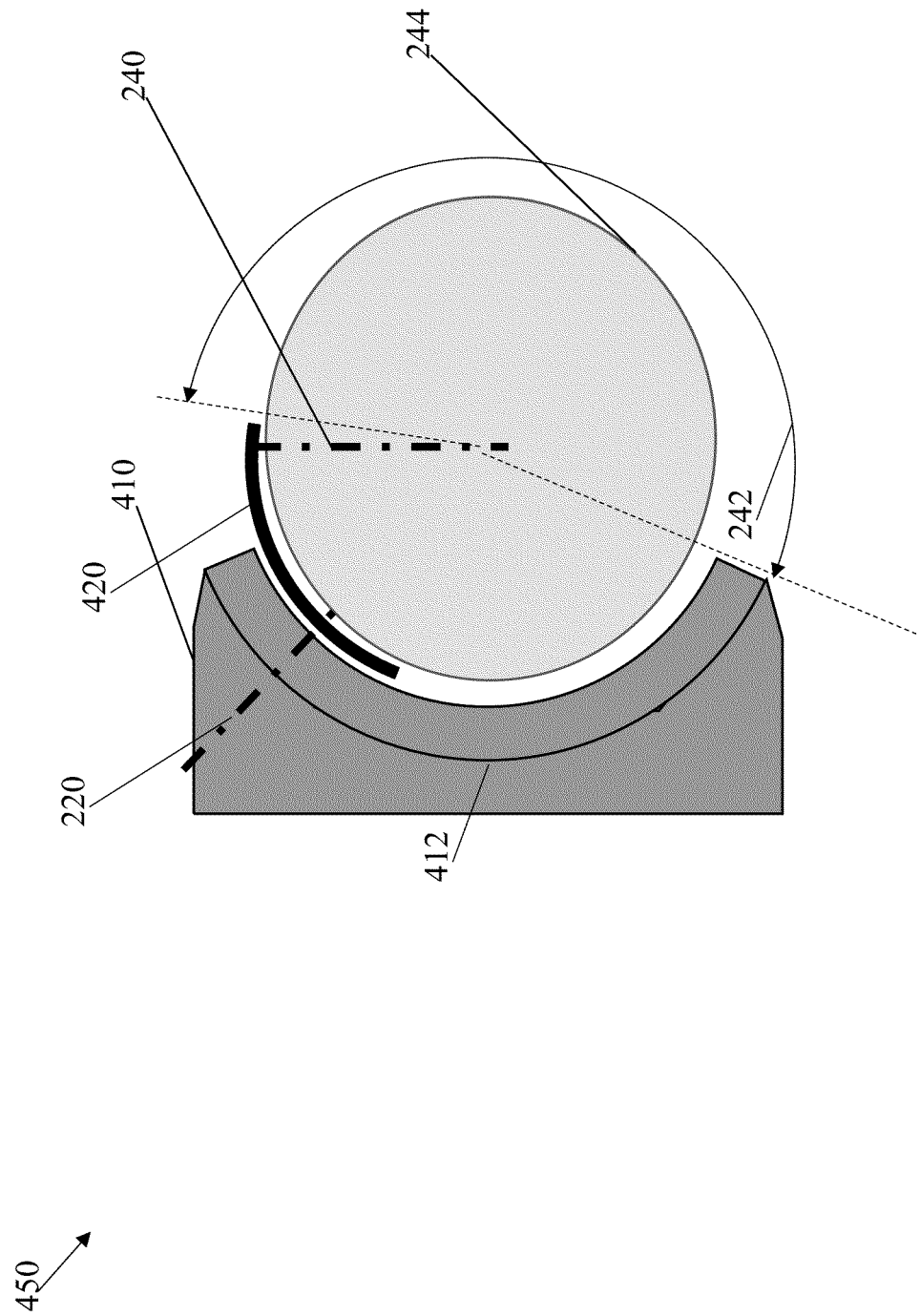

CORNER MOUNT

TWO AXIS PAN TILT CAMERA SYSTEM CONFIGURED TO MAINTAIN A LEVEL IMAGE WHEN WALL OR CEILING MOUNTED

TECHNICAL FIELD

The present disclosure relates generally to security systems. More particularly, the present disclosure relates to a camera in a security system.

BACKGROUND

Cameras, such as mini-dome cameras typically used for security, have a 3-axis gimbal which allows the lens and image module of the camera to pan (e.g., swivel the camera horizontally from a fixed position), tilt direction (e.g., the camera stays in a fixed position but rotates up/down in a vertical plane), and rotate so that the image can be level with the ground when wall mounted.

SUMMARY

One implementation of the present disclosure is a camera system. The camera system includes a support body, a camera, and one or more motors or manual adjustment mechanisms. The one or more motors or manual adjustment mechanisms are configured to control movement of the camera. The movement of the camera consists of control in a pan direction and in a tilt direction. The support body and the camera connect in a ceiling-mount configuration for connection of the camera system to a ceiling and a wall-mount configuration for connection of the camera system to a wall. The ceiling-mount configuration is different from the wall-mount configuration. In both the ceiling-mount configuration and the wall-mount configuration, a pan axis of the camera is always in a vertical direction parallel to the wall.

Another implementation of the present disclosure is a camera system. The camera system includes a support body including a surface configured to connect to a wall, a camera, and one or more motors or manual adjustment mechanisms configured to control movement of the camera. The movement of the camera consists of control in a pan direction and in a tilt direction. The movement of the camera does not include any rotational movement. A pan axis of the camera is always in a vertical direction parallel to the wall. The surface of the support body is parallel to the pan axis of the camera.

BRIEF DESCRIPTION OF THE DRAWINGS

The system may be better understood with reference to the following drawings and description. In the figures, like reference numerals designate corresponding parts throughout the different views.

FIG. 1B is a block diagram of the first example security camera system including the support body/camera subsystem mounted to the wall.

FIG. 4B is a cross-sectional view of the fourth example security camera system including the support body/camera subsystem mounted to the wall.

DETAILED DESCRIPTION

Figure 1A:
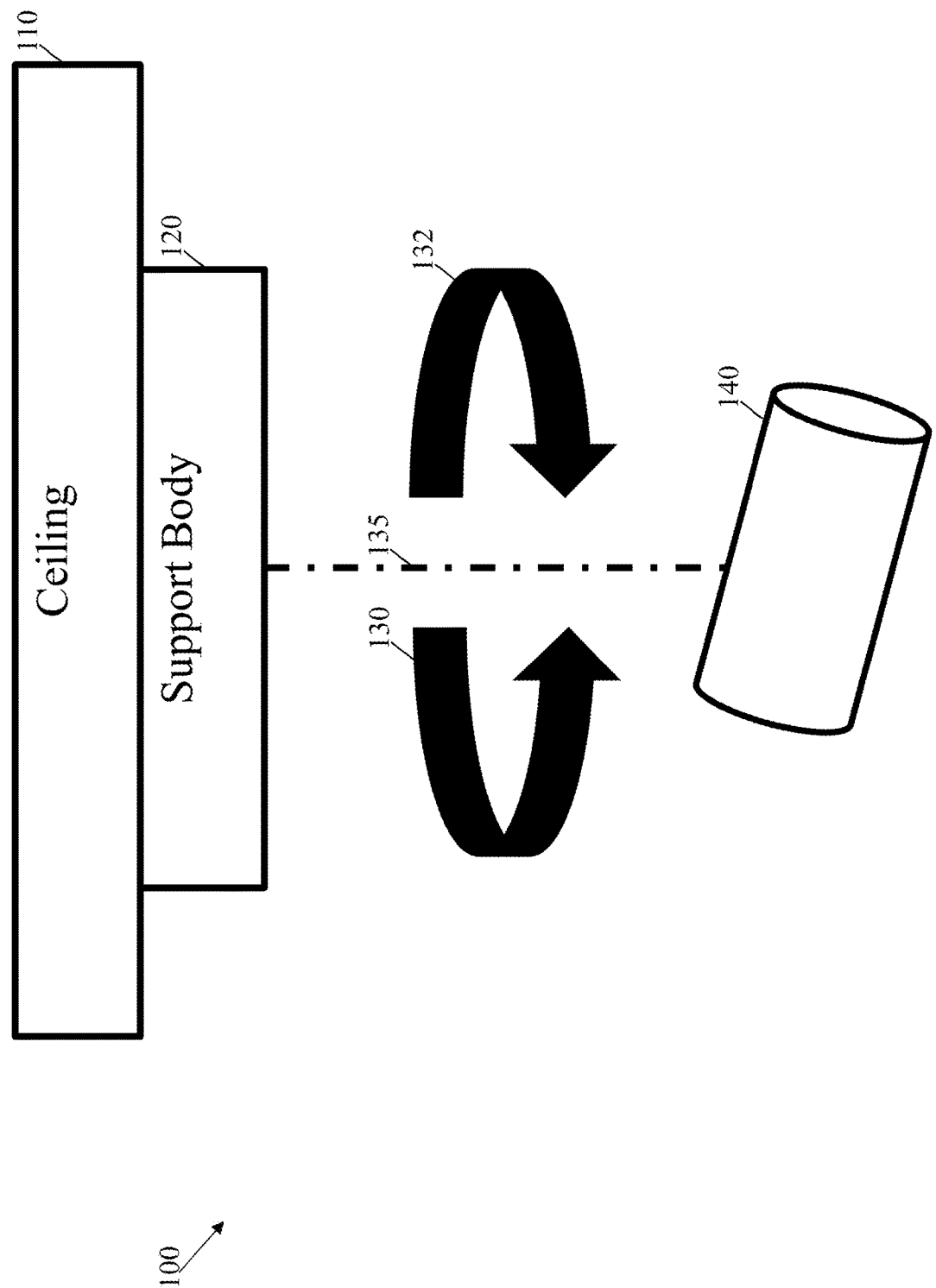
FIG. 1A is a block diagram of a first example security camera system including the support body/camera subsystem mounted on the ceiling.

Systems and methods in accordance with the present disclosure can provide a camera system that can maintain a level image when mounted to either a ceiling or wall, while using two axis—pan and tilt—functionality. As such, systems and methods in accordance with the present disclosure can reduce mechanical and electronic complexity as compared to security systems that may require motors or other adjustment mechanisms dedicated to moving in each of the pan (e.g., swivel the security camera horizontally from a fixed position), tilt (e.g., rotates up/down in a vertical plane), and rotate (e.g., so that the image can be leveled). Though not typically an issue with ceiling or pendant mounting of the security camera as pan movement rotates the security camera about the centroid and tilt movement adjusts the angle from the ceiling, a wall mounted security camera typically needs the rotation movement in order for the camera image to be level with the ground (since the panning or tilting may result in an image that is not level).

In some embodiments, a security camera system in accordance with the present disclosure is configured to perform pan and tilt movements, but is not configured to perform rotational movements. In particular, the one or more motors or manual adjustment mechanism in the security camera system are configured to control movement of the camera, wherein the movement consists of pan movement and tilt movement (e.g., control in the pan direction and in the tilt direction) without providing any Z-axis gimbal rotation as required in conventional systems. Nevertheless, the security camera system can maintain a level image when mounted to a ceiling and also when mounted to a wall. The security camera system may include a support body and a camera subsystem. The support body includes a mechanical support body or mechanical support structure to support the camera and optionally electronics configured to control the camera. The camera subsystem includes the camera and optionally other electronics (such as a motor). In some embodiments, the security camera system is configured to maintain the pan axis of the camera in the vertical direction (e.g., parallel to the wall) when the security camera system is wall mounted. In some embodiments, the security camera system is configured to maintain the pan axis of the camera in the vertical direction when the security camera system is either wall mounted or ceiling mounted. For example, the security camera system, in both the ceiling-mount configuration and the wall-mount configuration, positions the camera is in the same orientation, whereas in the ceiling-mount configuration and the wall-mount configuration, positions the support body in different orientations. In this way, the pan rotation of the camera moves the image directly right or left for either wall or ceiling mounting, and tilt with direct up and down movement. Since there is no camera head rotation with either pan or tilt movements, the image of the camera remains level with the ground, thus avoiding the need for an additional mechanism to rotate the lens in the Z-axis to level the image.

In various embodiments where the pan axis is in the vertical direction either for a wall mount or ceiling mount, the security camera system includes the support body and camera subsystem in at least two configurations: a wall-mounted configuration; and a ceiling-mounted configuration. In both the wall-mounted configuration and the ceiling-mounted configuration, the camera in the security camera system is configured so that the pan axis is always in the vertical direction. In order to maintain the pan axis in the vertical direction, the support body and the camera subsystem have different positions relative to one another when in the wall-mounted configuration or in the ceiling-mounted configuration. In particular, the security camera system has a wall-mounted relative position (the position of the support body relative to the camera subsystem when installed in the wall-mount) and a ceiling-mounted relative position (the position of the support body relative to the camera when installed in the wall-mount), with the wall-mounted relative position being different from the ceiling-mounted relative position. In this way, the same support body-camera subsystem may be used in either the wall-mounted configuration or in the ceiling-mounted configuration such that after installation, the camera (of the camera subsystem) is positioned so that the pan axis is in the vertical direction.

In some embodiments, the support body may be rotated and/or flipped about an axis (such as rotated 180° about an axis as discussed below) relative to the camera subsystem in order to switch the security camera system from the wall-mounted configuration to the ceiling-mounted configuration, or from the ceiling-mounted configuration to the wall-mounted configuration. In some embodiments, the support body is rotated and/or flipped about the axis, and the camera subsystem remains stationary. In some embodiments, the camera subsystem is rotated and/or flipped about the axis, and the support body remains stationary. In some embodiments, both the support body and the camera subsystem are rotated and/or flipped about the axis. In various such embodiments, the camera (of the camera subsystem), when installed in either the wall-mounted configuration or in the ceiling-mounted configuration, is positioned such that the pan axis is in the vertical direction.

The rotation and/or flipping may be performed in one of several ways. In some embodiments, the support body and the camera subsystem are rotated and/or flipped about the axis while the support body and the camera subsystem are connected to one another. For example, the connection point(s) between the support body and the camera subsystem may be configured for a swiveling motion (and optionally unlocking prior to the swiveling motion to allow for the swiveling movement and/or locking after the swiveling motion to disallow for the swiveling movement). In some embodiments, the support body and the camera subsystem are disconnected from one another, with one of the support body and the camera subsystem being flipped (such as the support body being flipped), and thereafter the support body and the camera subsystem are reattached to one another. For example, the support body and the camera subsystem may each have respective connectors through which to electronically communicate. One or both of the respective connectors may be double sided. For example, electronics in the camera subsystem may have a connector with a first side and a second side. On the first side, the connector may have a first set of connector pins, and on the second side, the connector may have a second set of connector pins. The support body may likewise have a connector with a set of pins. In the wall-mounted configuration, the support body may connect its set of pins with the first set of connector pins. Likewise, after flipping and/or rotating, for the ceiling-mounted configuration, the support body may connect its set of pins with the second set of connector pins. As another example, the support body may have a connector with a first side and a second side, with sets of pins on each of the first side and the second side. The camera subsystem may connect in the wall-mounted configuration with pins on the first side of the connector, and may connect in the ceiling-mounted configuration with pins on the second side of the connector.

Thus, in some embodiments, for wall-mounted installation, the camera of the security camera system may have the pan axis always configured in the vertical direction (e.g., parallel to the wall on which the camera system is mounted or perpendicular to the ground). The support body has a surface that is configured to attach to the wall, with at least a part of the surface that is configured to attach to the wall being parallel to the vertical pan axis of the camera. As discussed above, the camera subsystem may include a motor for moving the camera about the pan axis. In some embodiments, the shaft of the motor is perpendicular to the ground. Further, in some embodiments, the belt for the motor, which moves the shaft, is perpendicular to the wall to which the security camera system is attached. In this way, the security camera system may only include one or more motors for panning and tilting movement, but not for any rotational movement of the camera in the security camera system. It will be appreciated that a wall may be a surface that is vertical by being substantially parallel to a gravity direction (e.g., a vector normal to the wall forms an angle with the gravity direction that is 90 degrees or within a threshold value of 90 degrees, the threshold value being less than or equal to 10 degrees). It will be appreciated that a ceiling may be a surface that is horizontal by being substantially perpendicular to the gravity direction (e.g., a vector normal to the ceiling forms an angle with the gravity direction that is 0 degrees or within a threshold value of 0 degrees, the threshold value being less than or equal to 10 degrees).

Referring to the figures, FIG. 1A is a block diagram 100 of a first example of the support body 120/camera subsystem 140 mounted on the ceiling 110. The camera (not shown) in the camera subsystem 140 includes pan axis 135 that rotates in the pan direction such as rotating in direction 130 or direction 132. As shown, the pan axis 135 for the camera is vertical (perpendicular to the ground and the ceiling 110). As illustrated in FIG. 1A, the support body 120 is coupled to the camera subsystem 140 in a first orientation such that the pan axis 135 is vertical when the support body 120 is mounted on the ceiling 110.

FIG. 1B is a block diagram 150 of the first example of the support body 120/camera subsystem 140 mounted to the wall 160. As shown, the same support body 120 used for the ceiling-mounted configuration (illustrated in FIG. 1A) is used for the wall-mounted configuration (illustrated in FIG. 1B); however, the portion of the support body 120 connected to the non-movable structure (either the ceiling 110 or the wall 160) is different for the ceiling-mounted configuration versus the wall-mounted configuration. Further, the orientation of the support body 120 relative to the camera subsystem 140 is different for the ceiling-mounted configuration versus the wall-mounted configuration, as discussed further below.

FIGS. 1A-B illustrate the architecture that may eliminate the need to rotate the camera in the Z-axis. Motors (not shown) may be positioned in the support body 120 and/or the camera subsystem 140 for adjusting the camera remotely in the pan and/or tilt positions. Further, FIGS. 1A-B illustrate that a single security camera system (with support body 120 and camera subsystem 140) may be used for ceiling and/or wall mounting.

Figure 2A:
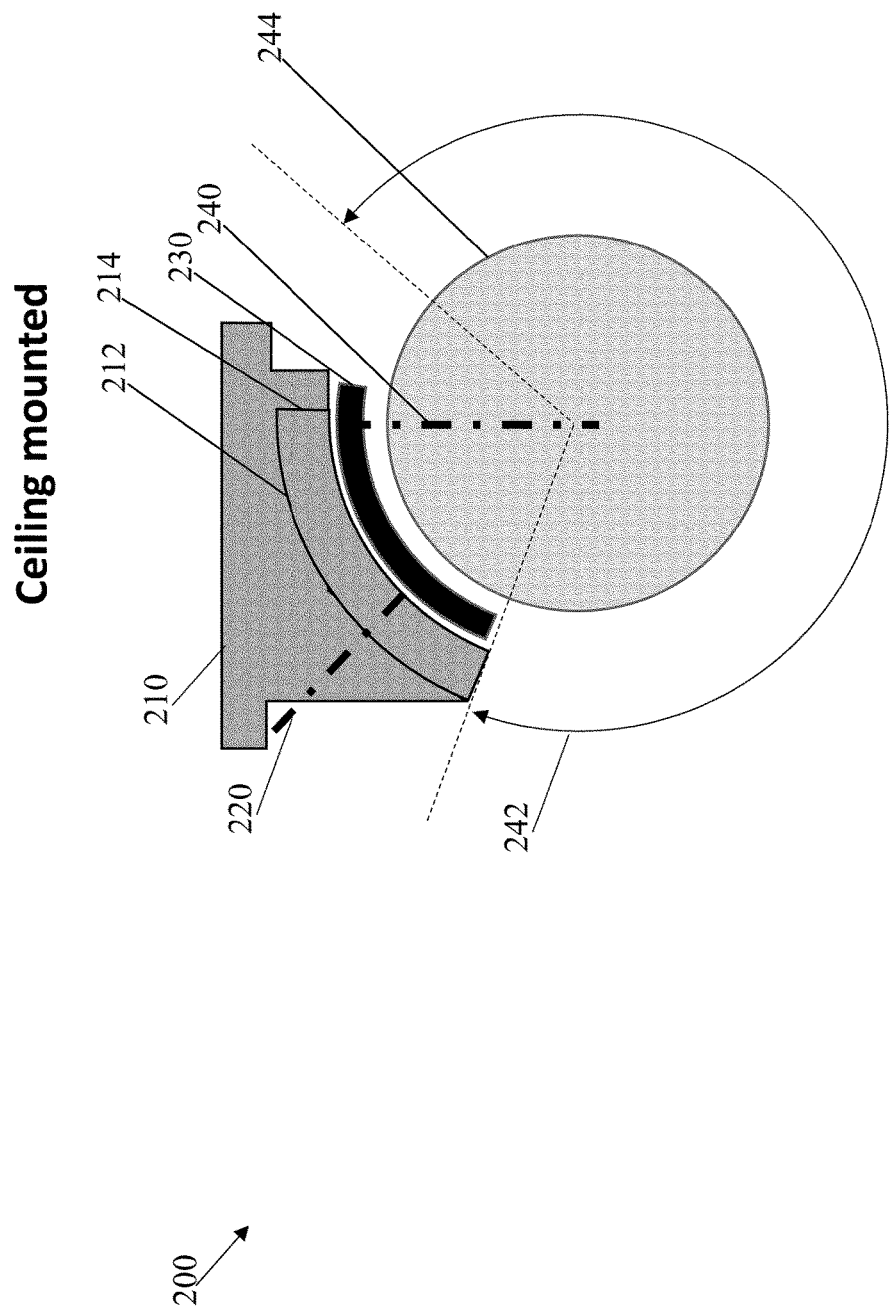
FIG. 2A is a cross-sectional view of a second example security camera system including the support body/camera subsystem mounted on the ceiling.
Figure 2B:
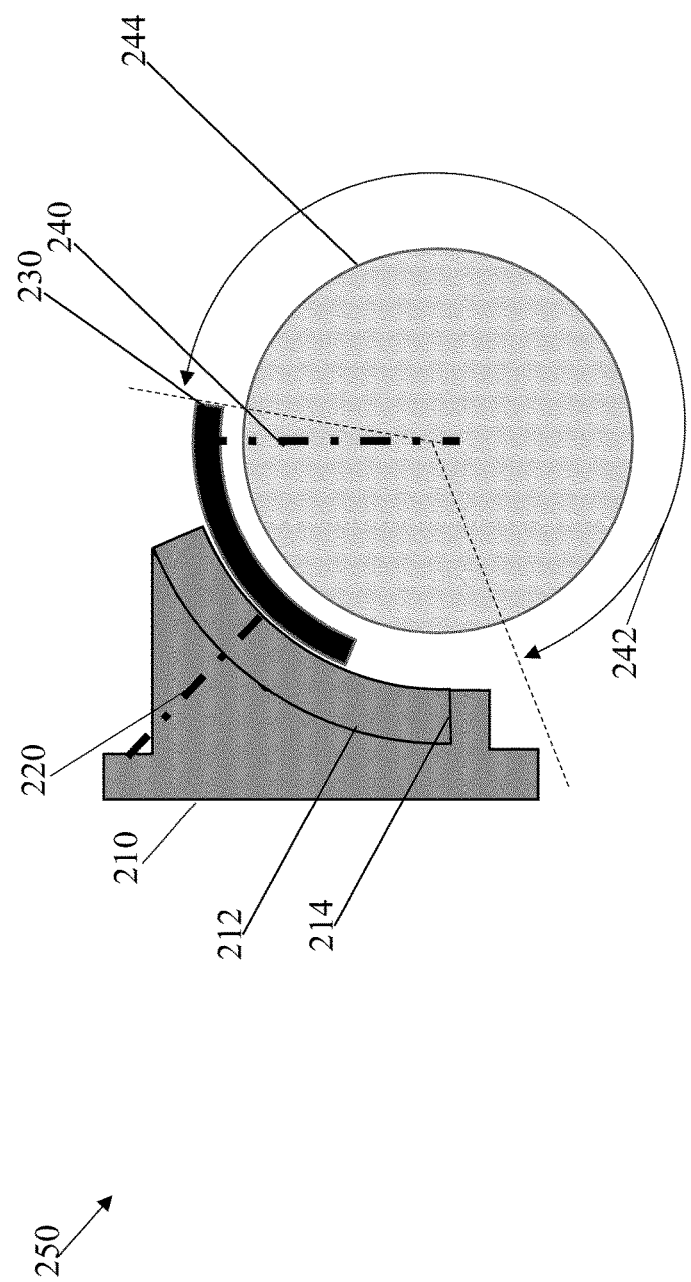
FIG. 2B is a cross-sectional view of the second example security camera system including the support body/camera subsystem mounted to the wall.

FIG. 2A is a cross-sectional view 200 of a second example of the support body 210/camera subsystem 230, 244 mounted on the ceiling. FIG. 2B is a cross-sectional view 250 of the second example of the support body 210/camera subsystem 230, 244 mounted to the wall. As shown, the same support body 210/camera subsystem 230, 244 is used for each configuration illustrated in FIGS. 2A-B, thus enabling one product to encompass wall and ceiling mounted security camera applications (e.g., bullet-type camera and mini-dome-type camera applications). The support body 210, which may contain the camera electronics, and may be positioned for the different installation options (wall mount and ceiling mount). As shown, there are two concentric caps, shown as 212 and 230. Support body 210 (and cap 212) may rotate around a 45 degree axis 220 to select the wall or ceiling mounted configuration. In effect, the support body 210 rotates 180 degrees about the 45 degree axis 220 to change from a ceiling-mounted configuration to a wall-mounted configuration, and vice-versa. The change in orientation of support body 210 is illustrated by side 214 in the wall and ceiling-mounted configurations. The camera ball 244 may pan around the vertical axis 240, which is attached via cap 230 and always stays vertical. The camera ball 244 may also tilt orthogonally to the pan axis and may tilt along a span 242, which is approximately 260°.

In this way, the camera security system may allow horizontal camera viewing (such as full viewing in all 360 degree directions) and below when ceiling mounted, such as to tilt along span 242 discussed above. Also, the security camera system may allow camera viewing well above the horizon. The security camera system disclosed herein may be used with a variety of different types of cameras, including without limitation full camera/lens cover bubble or with a bubble-less flat clear disc lens cover, or none, as any of these may prove optimal to support higher resolution cameras such as 4K. The designs may be constructed to provide covertness to where the camera is pointing. Provisions for IR illuminators located beside the lens in separate compartments such as not to reflect or bleed into the lens may be incorporated. The 45 degree axis 220 may be referred to as a 3rd axis to meet the 3 axis bid requirements. This security camera system may eliminate the traditional need for an analog video output often needed to connect to a local portable service monitor needed to point and level the camera image. In this way, the security camera system disclosed herein, with the feature of limited remote motor driven pan and tilt for easy installation and occasional re-positioning, is considerably different from a typical full speed PTZ or fixed dome camera.

For easy and universal installation, support body 210 may have mounting holes to match standard electrical boxes, which may include: single/dual gang; 4S; octagon; UK single gang box; Euro gang box; etc. In addition, support body 210 may be designed for other direct mounting situations including recessed into surface, pendant cap, inside corner, outside corner, and pole mounting by having extra slots for straps or tabs, and having curved or angular edges to mate with these surfaces, as discussed further below.

Figure 3A:
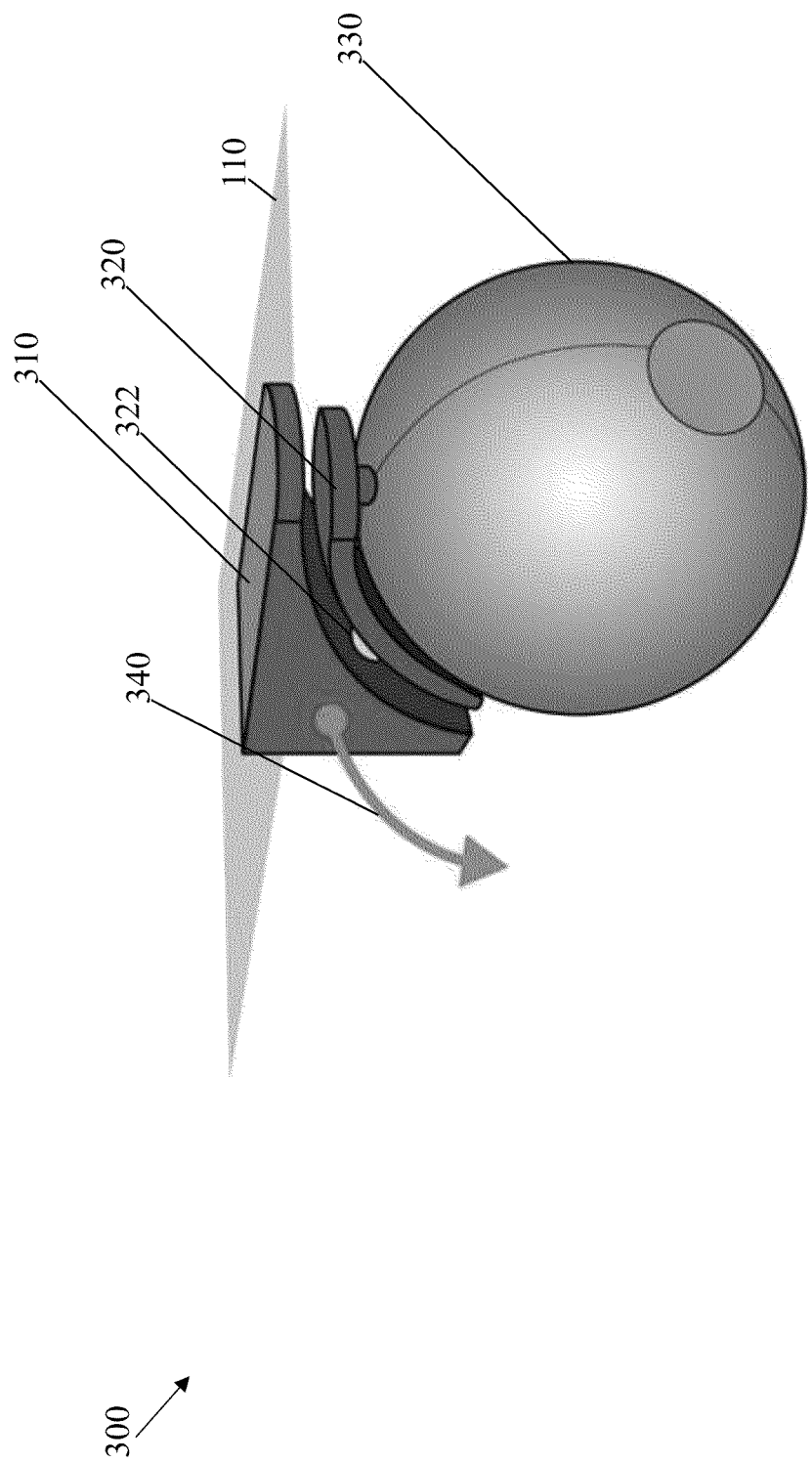
FIG. 3A is a 3-dimensional representation of a third example security camera system including the support body/camera subsystem mounted on the ceiling.
Figure 3B:
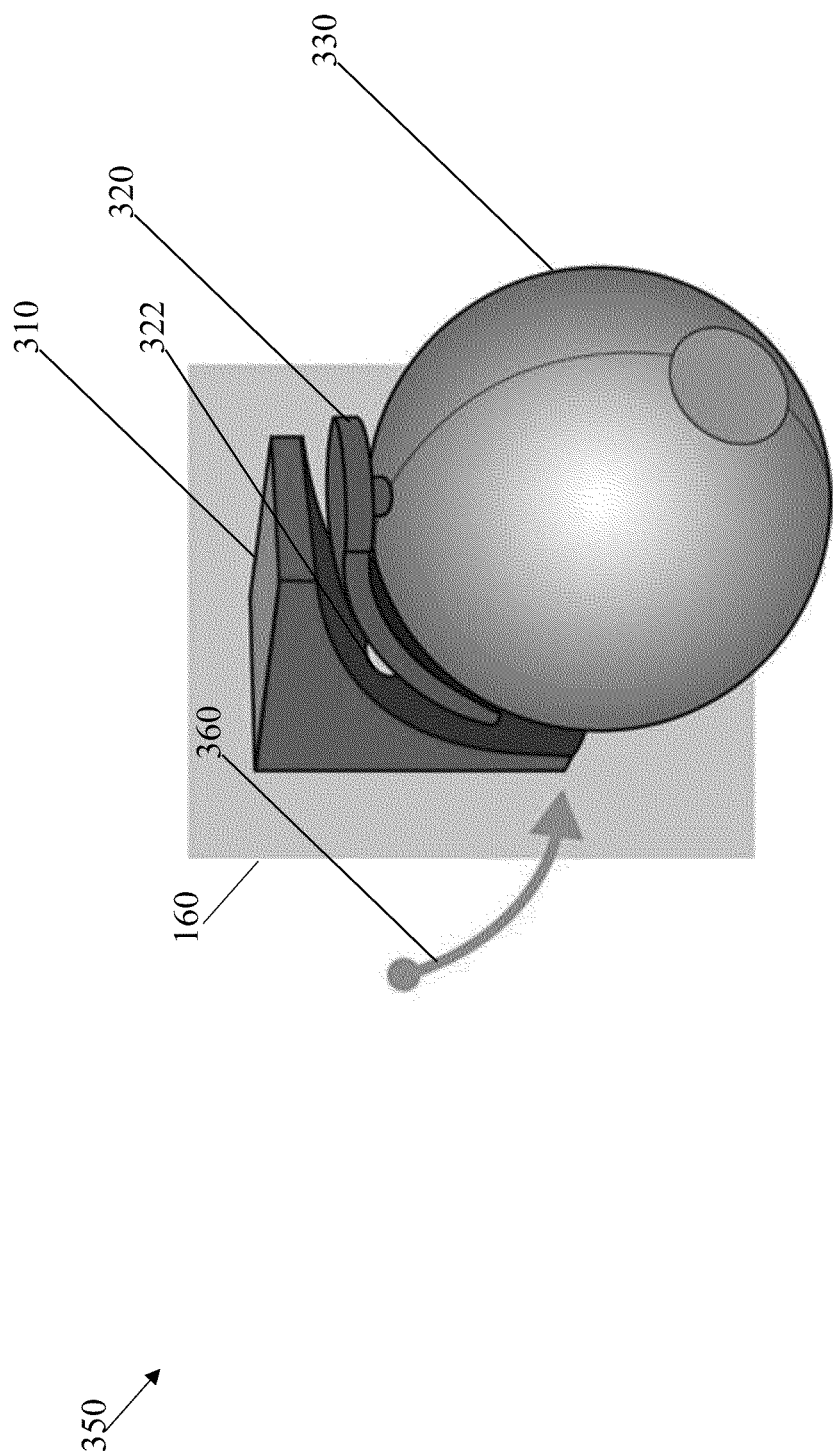
FIG. 3B is a 3-dimensional representation of the third example security camera system including the support body/camera subsystem mounted to the wall.

FIG. 3A is one of several possible 3-dimensional representation 300 of a third example of the support body 310/camera subsystem 320, 330 mounted on the ceiling 110. FIG. 3B is a 3-dimensional representation 350 of the third example of the support body 310/camera subsystem 320, 330 mounted to the wall 160. The support body 310 may be rotated, such as in direction 340 (shown in FIG. 3A) or in direction 360 (shown in FIG. 3B) to change the configuration of the security camera system. For example, to change the security camera system from a ceiling mounted configuration to a wall-mounted configuration, the support body 310 may be rotated in direction 340, and rotation about axis 322. As another example, to change the security camera system from a wall-mounted configuration to a ceiling mounted configuration, the support body 310 may be rotated in direction 360. As shown, the camera ball 330 and arm 320 remain in the same orientation for both the ceiling-mounted configuration and the wall-mounted configuration.

The rotation of support body 310 may be performed while support body is connected to camera subsystem. For example, support body 120 may be connected via pivot point 322 to arm 320 of camera subsystem. In this way, support body 120 may pivot at pivot point 322 where the support body 120 rotates relative to camera subsystem (e.g., arm 320 and camera ball 330 may rotate along direction 340, 360 in an arc. Further, instead of a camera ball 330 the camera may be cylindrical, oval (e.g., egg shaped), hemispherical, etc. in shape. Further, arm 320 may comprise a concentric cap or an arc (as shown), or may be disc shaped, hemispherical beanie shaped, or the like.

Figure 4A:
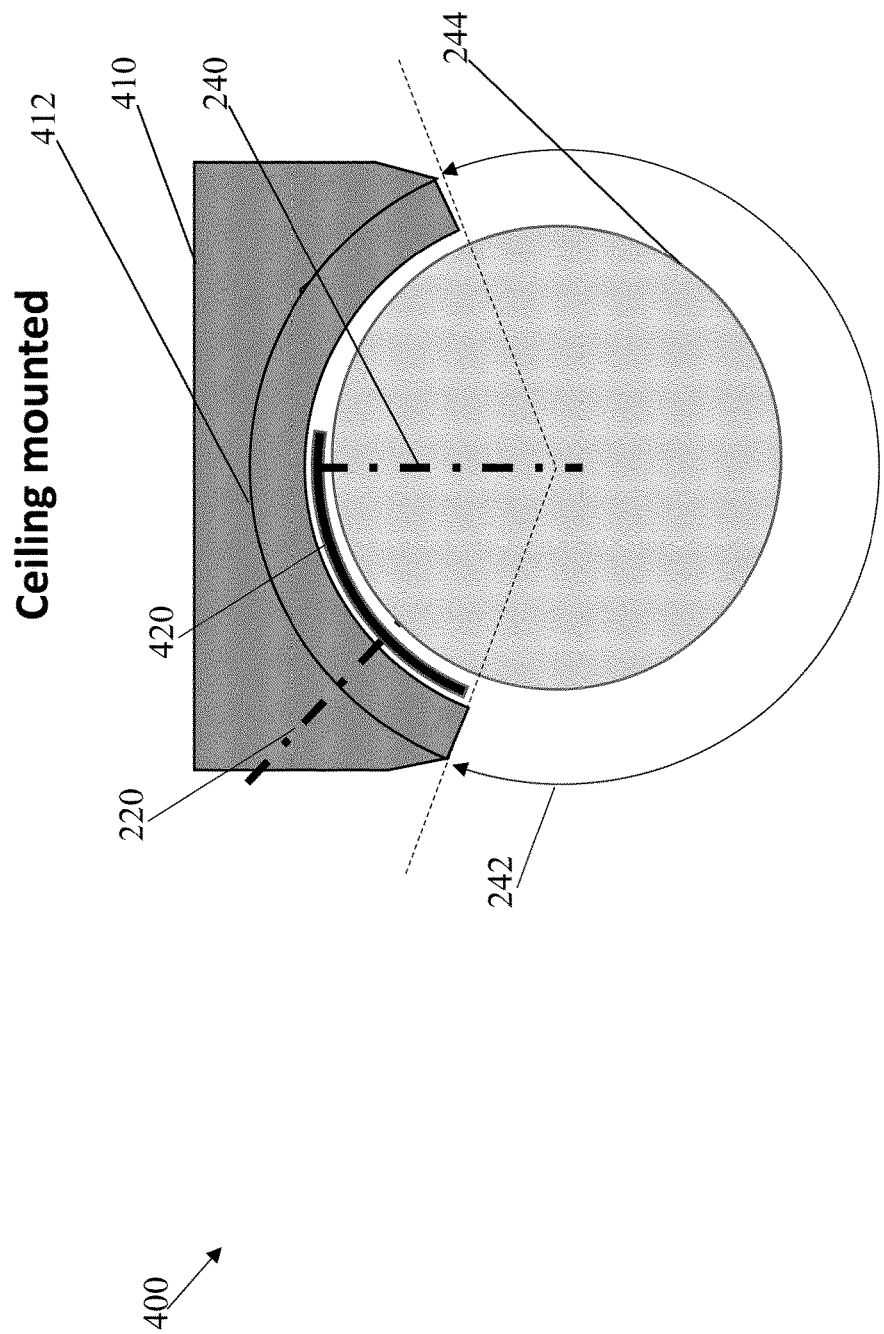
FIG. 4A is a cross-sectional view of a fourth example security camera system including the support body/camera subsystem mounted on the ceiling.

FIG. 4A is a cross-sectional view 400 of a fourth example of the support body 410/camera subsystem 244, 420 mounted on the ceiling. FIG. 4B is a cross-sectional view 450 of the fourth example of the support body 410/camera subsystem 244, 420 mounted to the wall.

Support body 410 may house electronics, motors, cables, mechanisms, and the like for the security camera system. In this regard, support body 410 may be larger than support body 210 illustrated in FIGS. 2A-B. FIGS. 4A-B illustrate arc 412 as hemispherical or beanie shapes. Similar to FIGS. 2A-B, arm 420 may connect camera ball 244 to support body 410. Further, camera ball 244 may pan around the vertical axis 240, which always stays vertical.

Figure 5A:
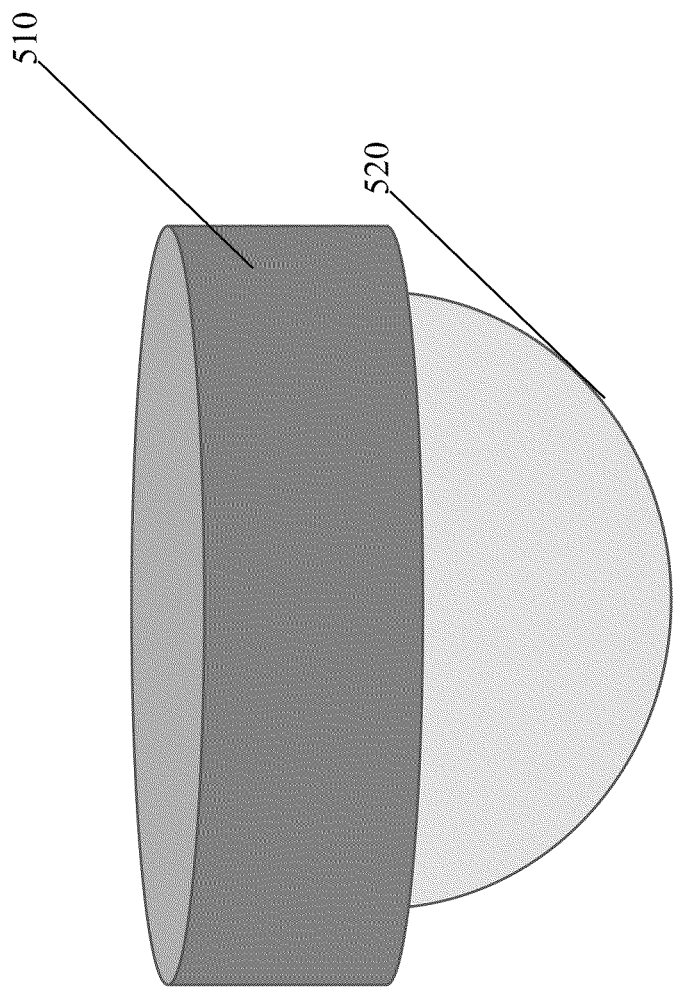
FIG. 5A is a 3-dimensional representation of a fifth example security camera system including the support body/camera subsystem mounted on the ceiling.
Figure 5B:
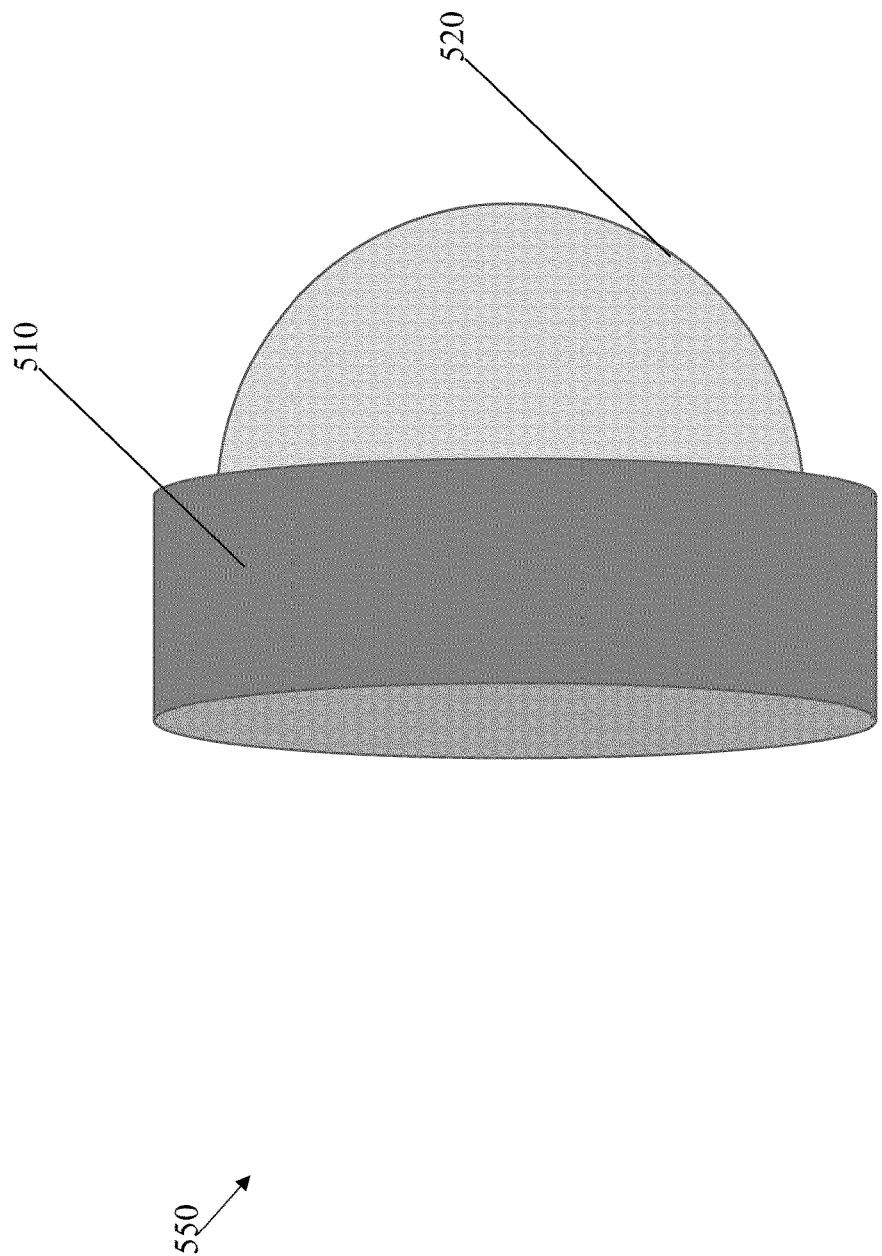
FIG. 5B is a 3-dimensional representation of the fifth example security camera system including the support body/camera subsystem mounted to the wall.

FIG. 5A is a 3-dimensional representation 500 of a fifth example of the support body 510/camera subsystem 520 mounted on the ceiling. FIG. 5B is a 3-dimensional representation 550 of the fifth example of the support body 510/camera subsystem 520 mounted to the wall.

Figure 6A:
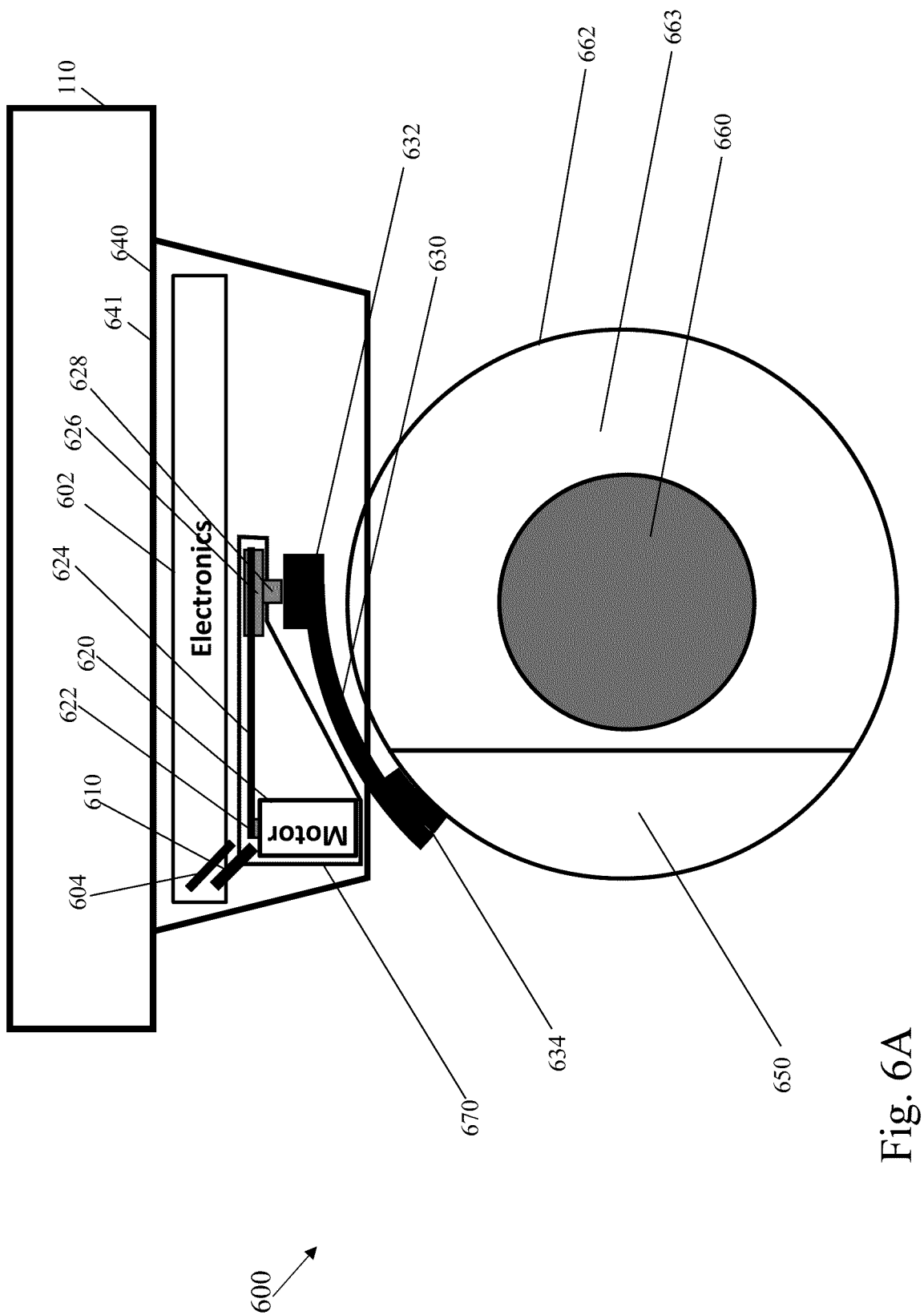
FIG. 6A is a schematic representation of a sixth example security camera system including the support body/camera subsystem mounted on the ceiling.

FIG. 6A is a schematic representation of camera security system 600 in a sixth example of the support body/camera subsystem mounted on the ceiling. In one implementation, the support body may comprise support structure 640, which may include electronics 602. In particular, surface 641 of support structure 640 may be connected to ceiling 110. As discussed further below, electronics 602 may comprise control electronics, such as a computing element (e.g., a processor, microcontroller, programmable gate array, or the like) and memory. In practice, electronics 602 may be configured to communicate with a central command system (not shown), which may be remotely located from the security camera system. The communications with the central command system may include any one, any combination, or all of: transmission of images (still and/or video) from the security camera system to the central command; transmission of status from the security camera system to the central command; control of the security camera system (e.g., the central command system may send a command to configure one or more aspects of the security camera system; the central command system may send a command to control movement of the security camera system (e.g., control the pan movement motor 620 for pan movement or control the tilt movement motor (not shown) for tilt movement).

The camera subsystem may comprise motor subsystem 670, arm 630, and camera body 662 (within which is camera 660). The motor subsystem 670 may comprise a housing to house camera subsystem connector 610, pan movement motor 620, rotor 622, belt 624, gear 626, and shaft 628. Any of these elements may be housed completely within the housing of the motor subsystem 670. Alternatively, some of the elements, such as camera subsystem connector 610, may be housed only partially within the housing of the motor subsystem 670, or exterior to the housing of the motor subsystem 670. Arm 630 includes two ends, end 632 connected or attached to shaft 628 and end 634 connected to camera body 662. In one implementation, end 634 is permanently attached to camera body 662. In practice, pan movement motor 620 moves rotor 622, which in turn moves belt 624, gear 626, shaft 628, and arm 630 so that camera body 662 moves in the pan direction. Further, as shown, the camera security system 600 in FIG. 6A is configured such that the camera body 662 is configured to maintain the pan axis in the vertical direction when the camera security system 600 is ceiling mounted.

Camera body 662 may further include an internal tilt movement motor (not shown) in order to move a part of camera body 662. For example, portion 650 may remain stationary and portion 663 may move in the tilt direction.

Figure 6B:
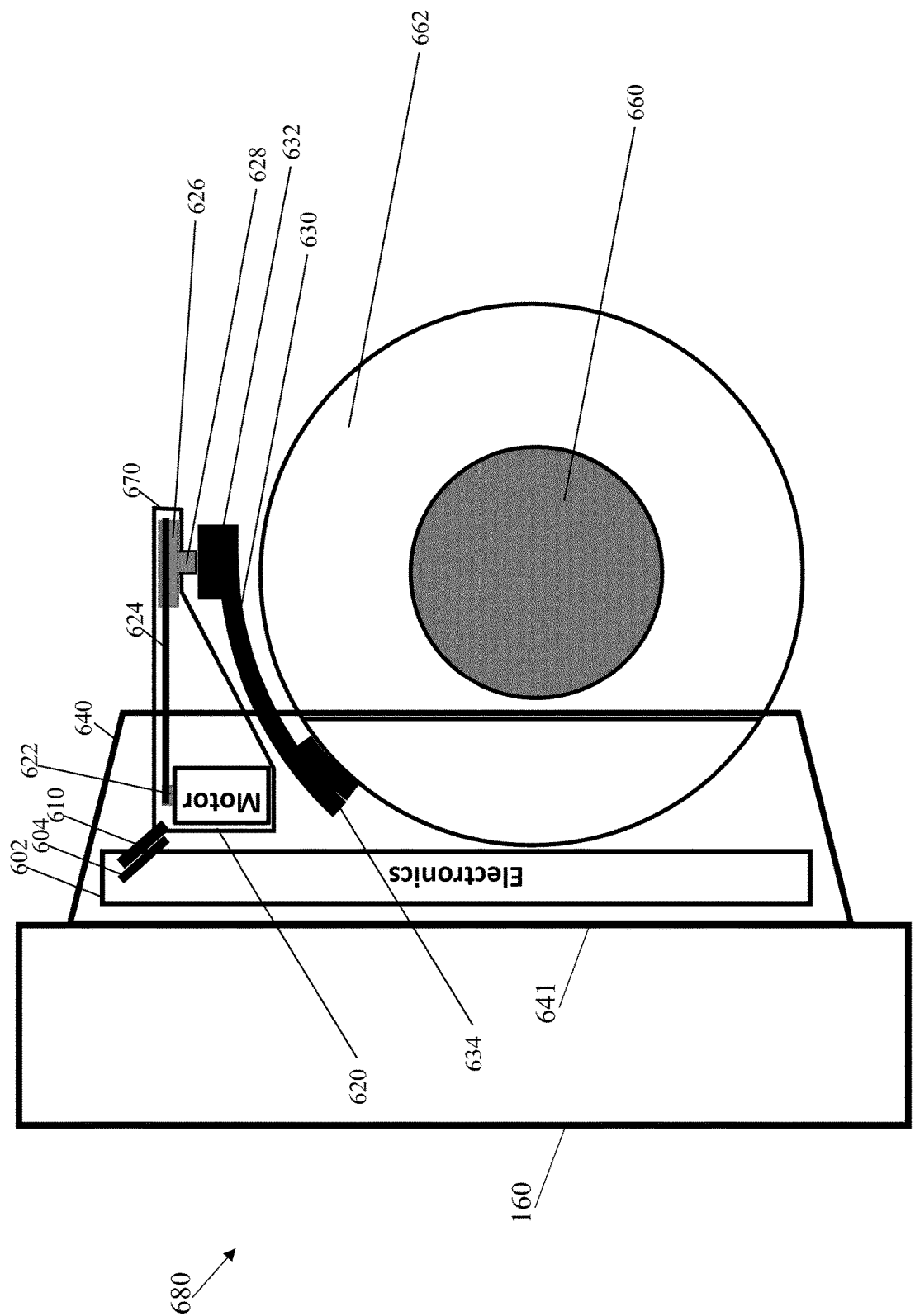
FIG. 6B is a schematic representation of the sixth example security camera system including the support body/camera subsystem mounted to the wall.

FIG. 6B is a schematic representation of the security camera system 680 (mounted to the wall) in the sixth example of the support body/camera subsystem. As shown, the orientation of the support body/camera subsystem is different than that depicted in FIG. 6A. In particular, support body, including support structure 640, may be flipped so that surface 641 of support structure 640 may be connected to wall 160. Support body connector 604 of the support body may still be connected to camera subsystem connector 610 of camera subsystem in either orientation depicted in FIGS. 6A-B. Further, as shown, the camera security system 680 in FIG. 6B is configured such that the camera body 662 is configured to maintain the pan axis in the vertical direction when the camera security system 600 is wall mounted.

Figure 6C:
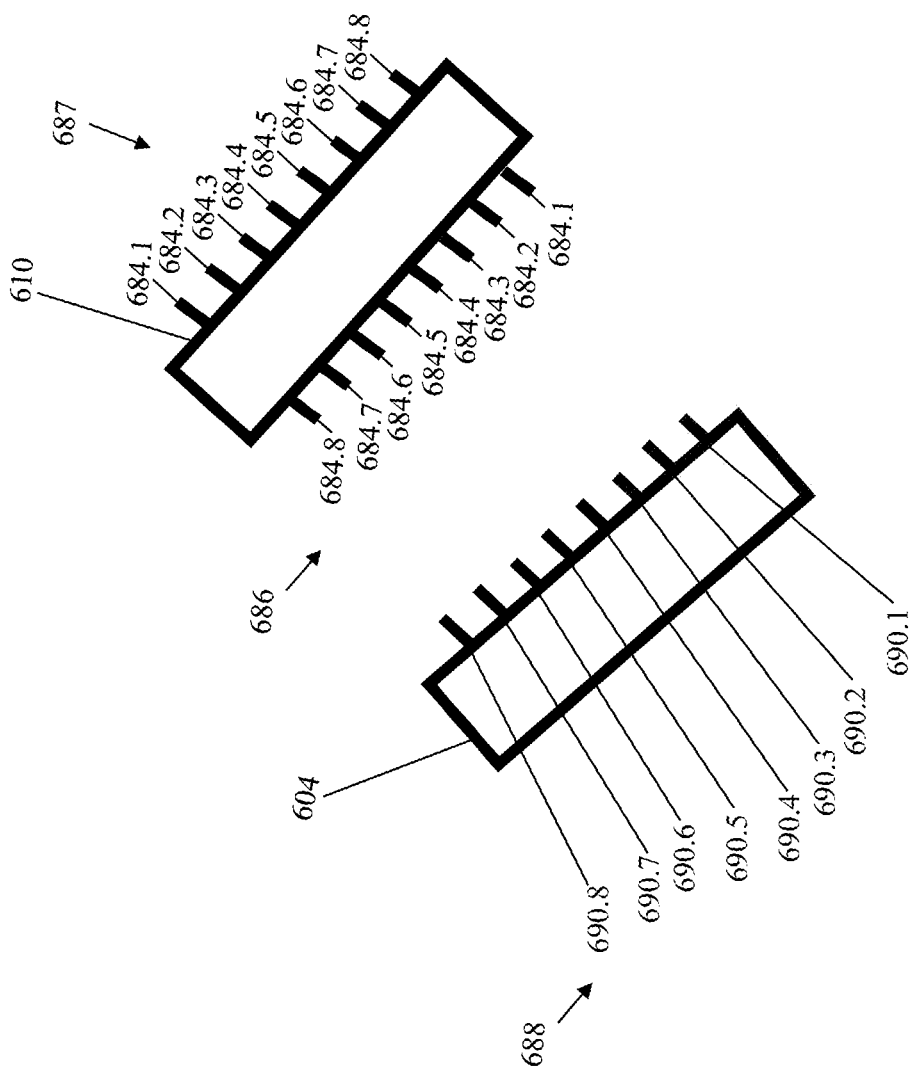
FIG. 6C is a schematic representation of a double sided connector.

FIG. 6C is a schematic representation of double sided camera subsystem connector 610. As discussed above, the orientation of support body/camera subsystem may change depending on whether the configuration is wall-mounted or ceiling mounted. In one implementation, one or more double-sided connectors may be used in order to allow for the different orientations of support body/camera subsystem. In particular, FIG. 6C illustrates that camera subsystem connector 610 of the camera subsystem may have two sets of pins 686, 687, with first set of pins 686 on one side of camera subsystem connector 610 and second set of pins 689 on the opposite side of camera subsystem connector 610. Each set of pins 686, 687 has the same set of pins 684.1, 684.2, 684.3, 684.4, 684.5, 684.6, 684.7, and 684.8. However, the ordering of the pins in the first set of pins 686 is different than the second set of pins 687. Specifically, the ordering is reversed so that the support body may be flipped while still maintaining the same connection to set of pins 688 on support body connector 604 of support body. As shown pins 688 includes pins 690.1, 690.2, 690.3, 690.4, 690.5, 690.6, 690.7, and 690.8. Pins 688 are oriented so that upon connection to either first set of pins 686 or second set of pins 687, the pins from 688 may connect as follows: 690.1 to 684.1; 690.2 to 684.2; 690.3 to 684.3; 690.4 to 684.4; 690.5 to 684.5; 690.6 to 684.6; 690.7 to 684.7; and 690.8 to 684.8. Thus, the support body/camera subsystem may be configured either in a first orientation (such as the ceiling-mounted configuration) or in a second orientation (such as the wall-mounted configuration). Alternatively, camera subsystem connector 610 on camera subsystem may have two sets of pins, with a first set of pins on one side (ordered as follows: 690.1, 690.2, 690.3, 690.4, 690.5, 690.6, 690.7, and 690.8) and with a second set of pins on an opposite side (ordered as follows: 690.8, 690.7, 690.6, 690.5, 690.4, 690.3, 690.2, and 690.1).

Figure 7A:
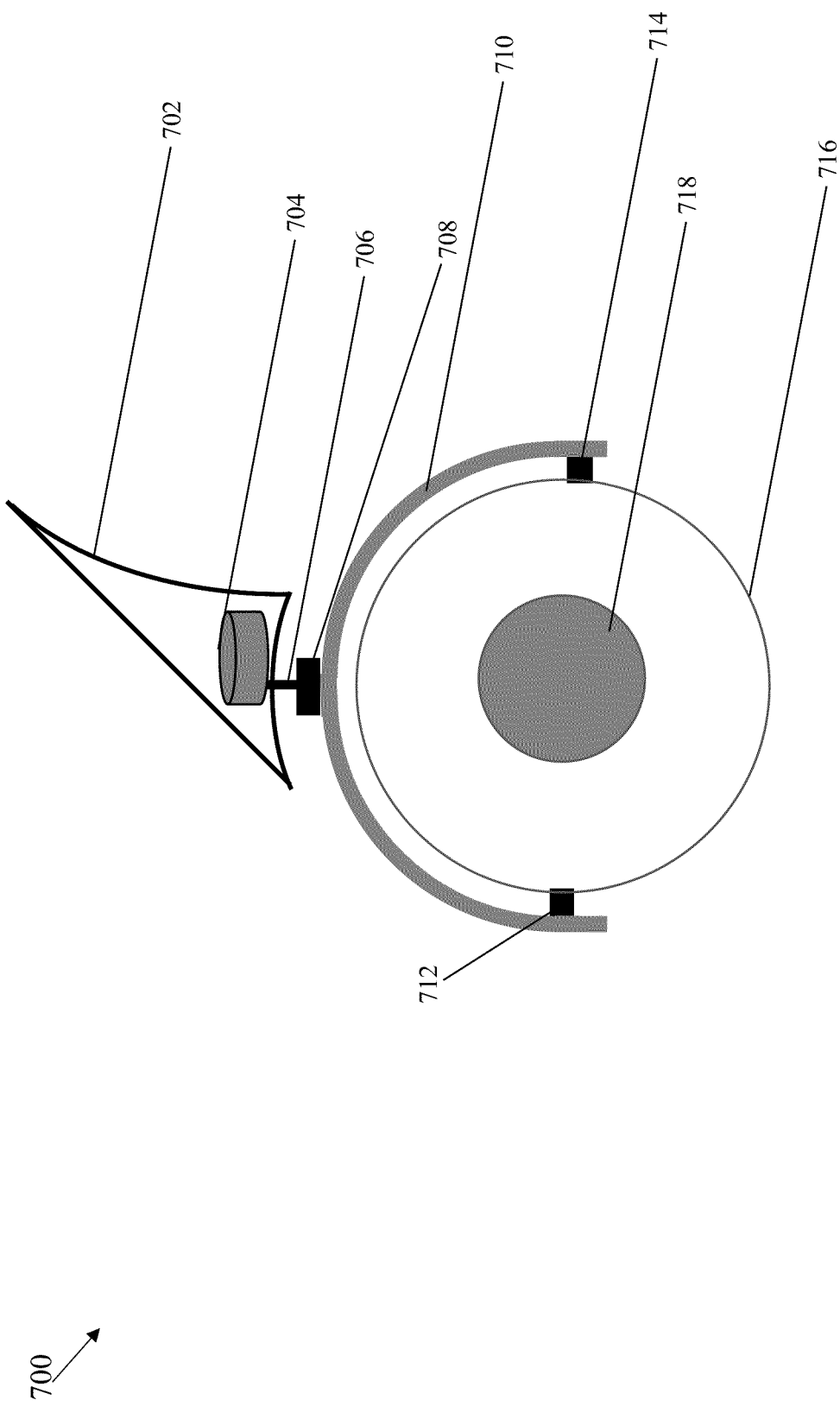
FIG. 7A is a schematic representation of a camera subsystem.

FIG. 7A is a schematic representation of a camera subsystem 700. Camera subsystem 700 includes an electronics base housing 702 configured to house pan motor 704. The slant on electronics base housing 702 (such as the 45° slant) on the top allows the electronics base housing 702 to be attached from the top or turned and attached from the side. This change at the 45° slant angle may be a movable joint or may simply separate and reattach to switch from ceiling mount to wall mount. As discussed above, if the pan axis is always vertical, then a rotate motor is not needed regardless of whether mounting to a ceiling or a wall. Likewise, tilt may always be an up or down movement. This will allow users to re-position the camera from the network video recorder (NVR) client by using the standard client GUI pan and tilt controls; therefore there is no need to add a remote rotate lens module command.

The security camera systems may not be full function PTZ (pan-tilt-zoom) dome, but simply the ability to pan and tilt. In this regard, the security camera system is not a full function PTZ, but a lower cost security camera system. Pan motor 704 is connected to rotor, which is connected to gimbal 710 via gimbal connector 708. Gimbal 710 is connected, via connectors 712, 714, to eyeball camera subsystem 716 (which includes eyeball camera 718). In this way, the eyeball camera 718 on the gimbal 710 may move with the pan motor 704. In this regard, pan motor 704 may comprise a pan motorized mechanism that will rotate the gimbal 710. The tilt motor (not shown) is in the eyeball camera subsystem 716, and may tilt about connectors 712, 714. The imager, lens and tilt motor may be connected with a single flexible coil type cable to the electronics in the base, as discussed further below. Though FIG. 7A illustrates eyeball camera 718, other types of cameras, such as dome, cylinder, or bullet cameras, may be used.

Figure 7B:
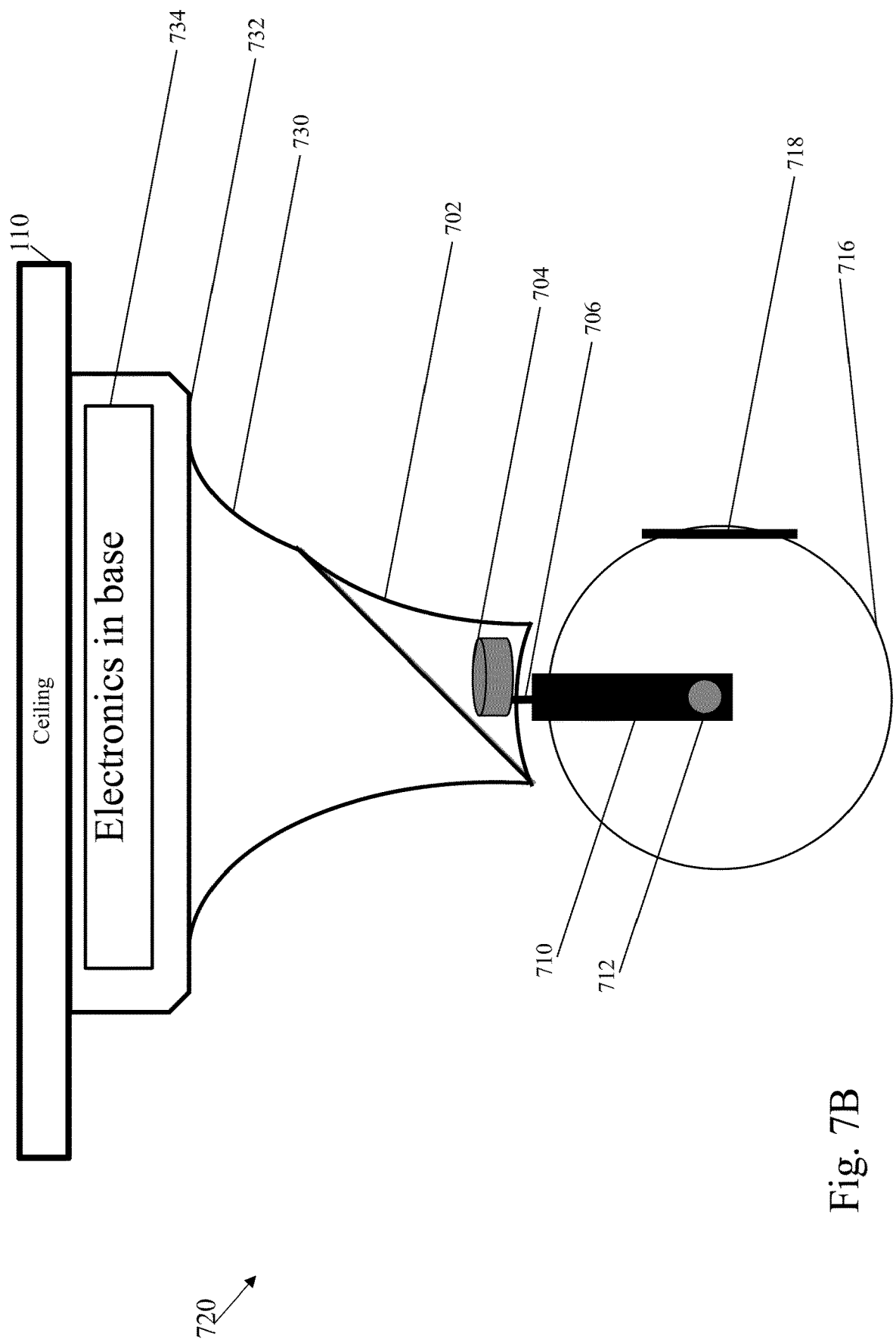
FIG. 7B is a schematic representation of a seventh example security camera system including the support body/camera subsystem (depicted in FIG. 7A) mounted on the ceiling.

FIG. 7B is a schematic representation of a seventh example security camera system 720 including the support body/camera subsystem 700 (depicted in FIG. 7A) mounted on the ceiling 110. Camera subsystem 700 may be housed or connected to housing 730, which is, in turn, is mounted to base 732. Electronics 734 may be housed in base.

Figure 7C:
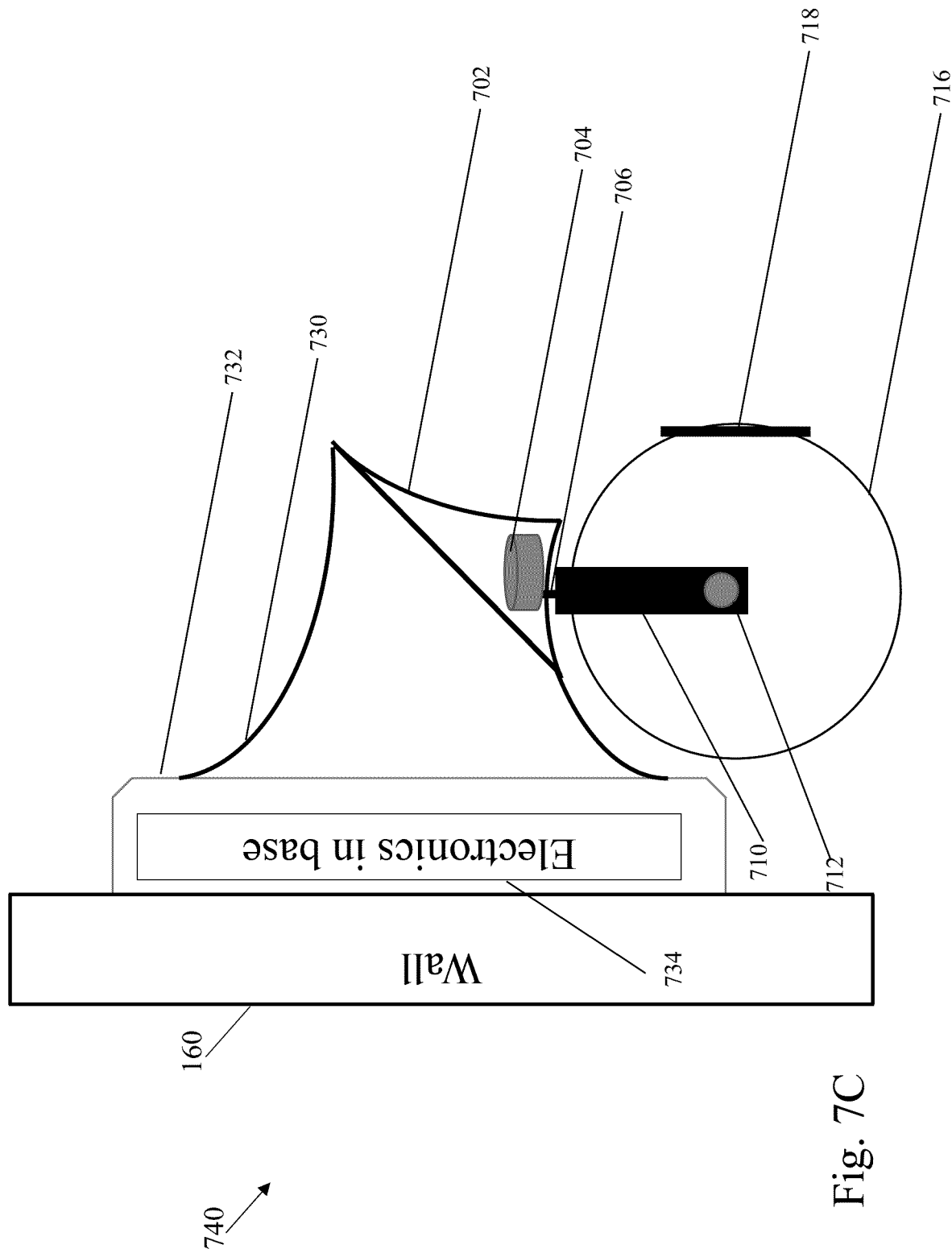
FIG. 7C is a schematic representation of the seventh example security camera system including the support body/camera subsystem (depicted in FIG. 7A) mounted to the wall.

FIG. 7C is a schematic representation of the seventh example security camera system 740 including the support body/camera subsystem 700 (depicted in FIG. 7A) mounted to the wall 160. As illustrated, the orientation of camera subsystem 700 relative to housing 730 is different from that depicted in FIG. 7B.

Figure 7D:
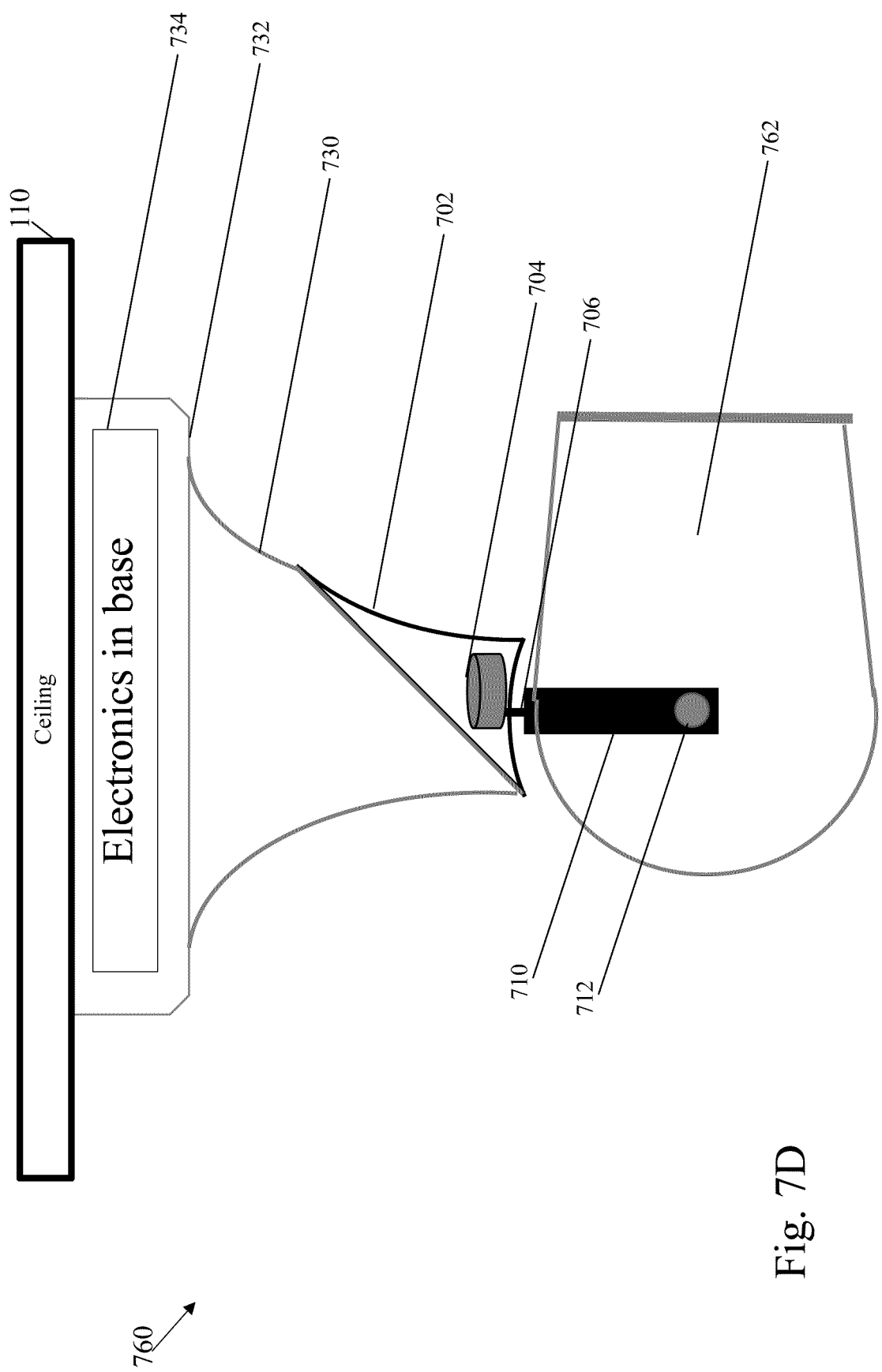
FIG. 7D is a schematic representation of the seventh example security camera system including the support body/bullet camera subsystem mounted to the ceiling.

FIG. 7D is a schematic representation of the seventh example security camera system 760 including the support body/bullet camera subsystem mounted to the ceiling 110. Specifically, bullet camera subsystem 762 may be used in place of eyeball camera subsystem 716.

Figure 8A:
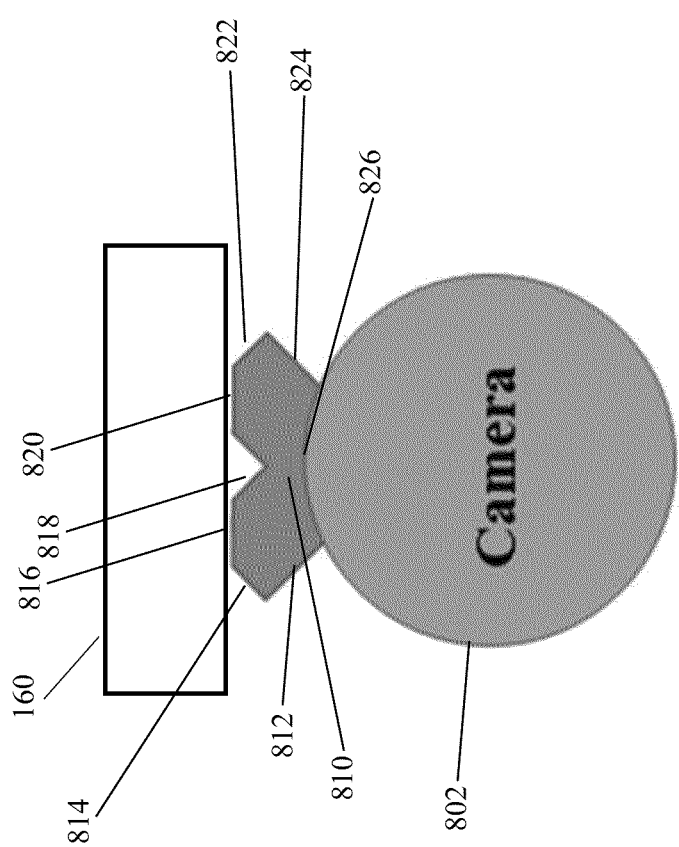
FIG. 8A is a block diagram of the camera mounted, via a shaped support body, to a wall.

FIG. 8A is a block diagram of the camera 802 mounted, via a shaped support body 810, to a wall 160. Surface 826 of support body 810 may contact a surface of camera 802. Further, one or more flat surfaces, such as surfaces 816, 820, may contact wall 160.

Figure 8B:
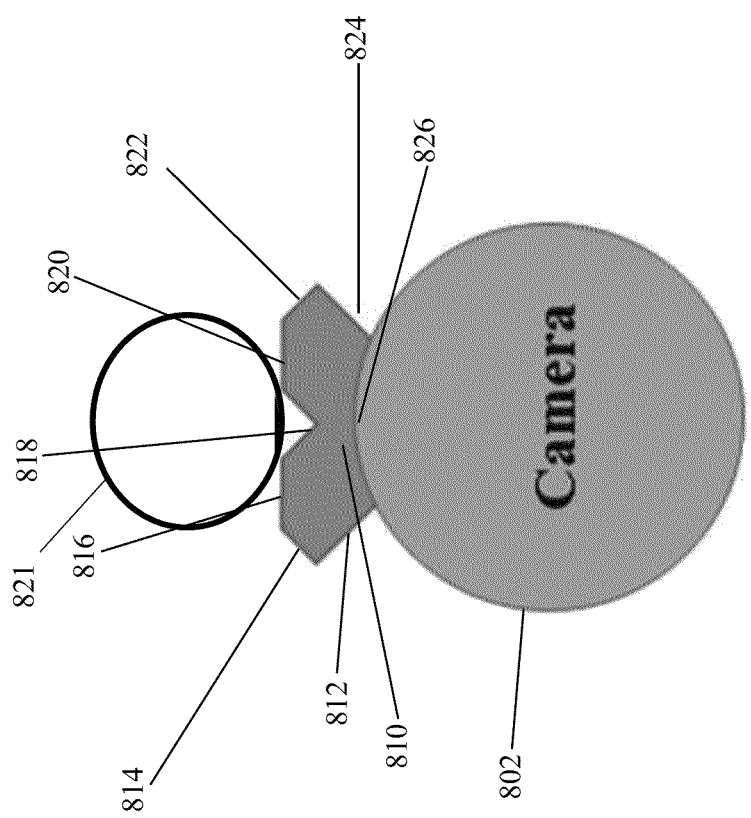
FIG. 8B is a block diagram of the camera mounted, via the shaped support body, to a post.

FIG. 8B is a block diagram of the camera 802 mounted, via the shaped support body 810, to a post 821. Post 821 may contact one or more flat surfaces, such as surfaces 816, 820 of support body 810. Alternatively, post 821 may contact one or more insets, such as inset 818 of support body 810.

Figure 8C:
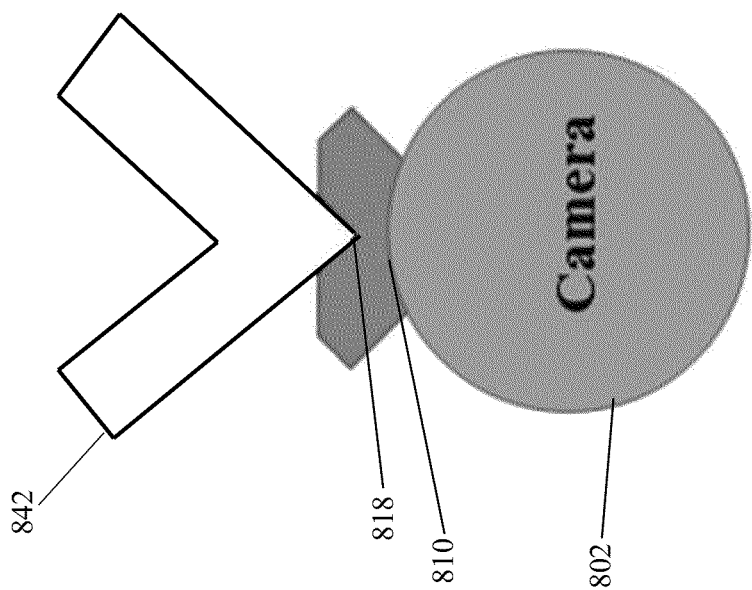
FIG. 8C is a block diagram of the camera mounted, via the shaped support body, to an outside corner.

Support body 810 may be configured to connect to different types of corners, such as to a first type of corner (e.g., an outside corner) and to a second type of corner (e.g., an inside corner). In particular, FIG. 8C is a block diagram of the camera 802 mounted, via the shaped support body 810, to an outside corner 842. Outside corner 842 may contact one or more insets in support body, such as inset 818 shaped to match the corner of outside corner 842.

Figure 8D:
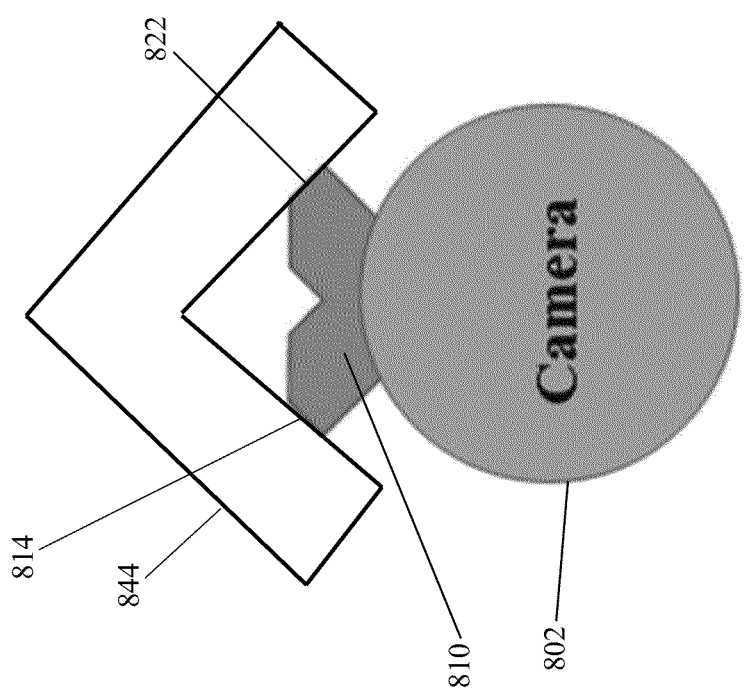
FIG. 8D is a block diagram of the camera mounted, via the shaped support body, to an inside corner.

FIG. 8D is a block diagram of the camera 802 mounted, via the shaped support body 810, to an inside corner 846. One or more sides of support body 810, such as sides 814, 822 (which may comprise flat edges), may contact one or more sides of inside corner 846. As illustrated, shaped support body 810 may include one or more shaped sides in order to connect with a plurality of objects, such as any one, any combination, or all of: wall; post; outside corner; and inside corner.

Figure 9A:
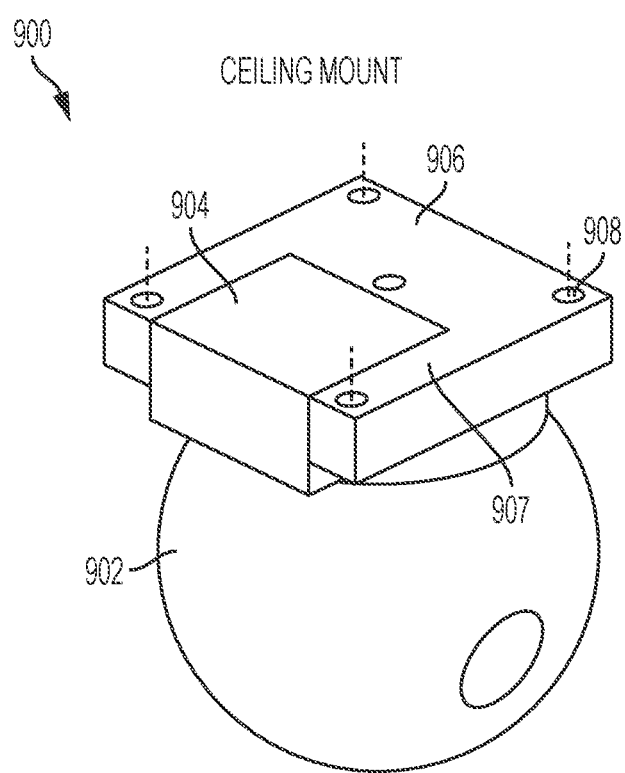
FIG. 9A is a 3-dimensional representation of an eighth example security camera system including the support body/camera subsystem mounted on the ceiling.

FIG. 9A is a 3-dimensional representation of an eighth example security camera system 900 including the support body 906/camera subsystem 902 mounted on the ceiling. In particular, support body includes one or more holes 908 on a surface 907 of support body 906. Camera subsystem 902 includes a mating piece 904 for mating with an inset 909 of support body 906.

Figure 9B:
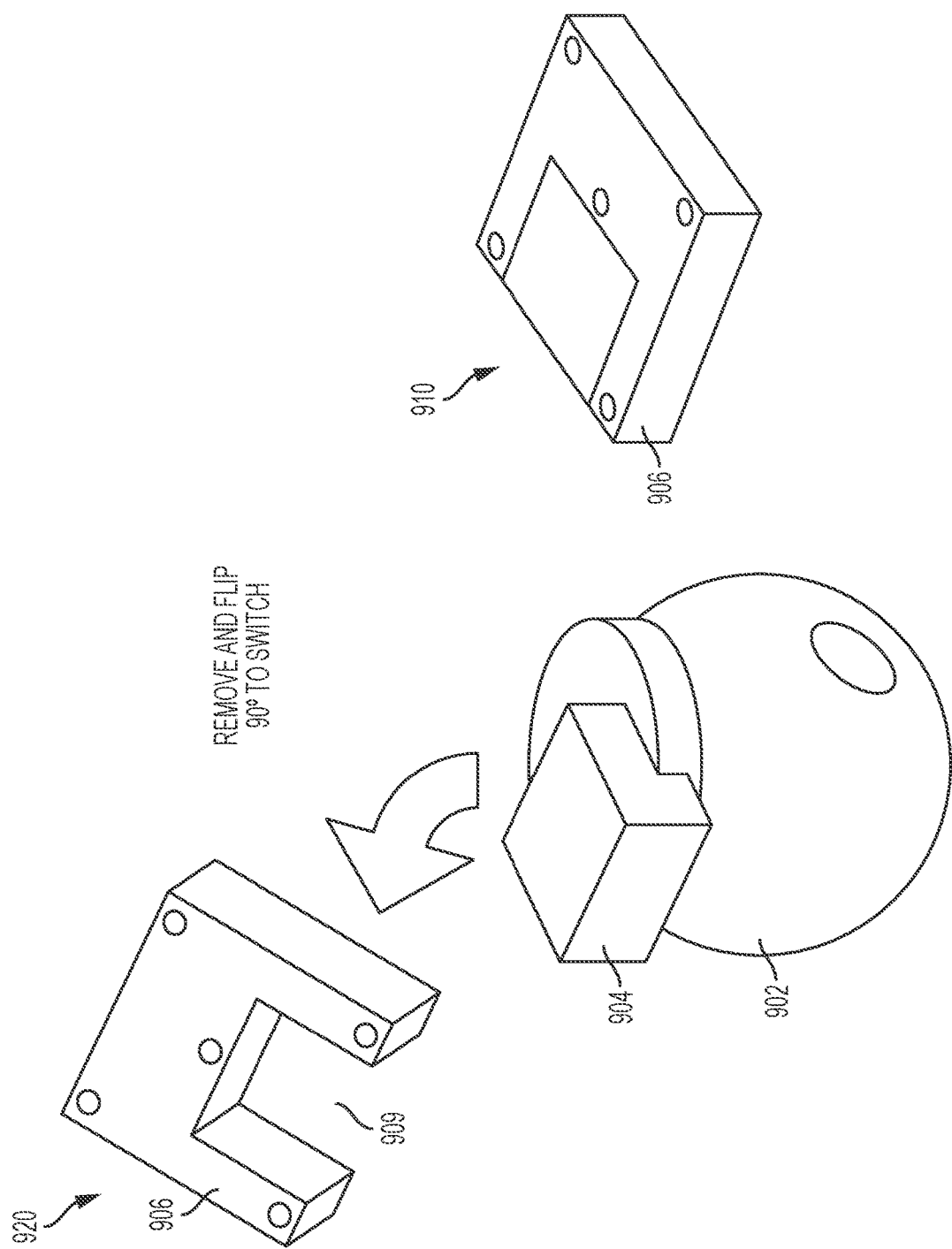
FIG. 9B is a 3-dimensional representation of the eighth example security camera system including the support body/camera subsystem with the support body being removed and flipped 90° to change to a wall mount.

FIG. 9B is a 3-dimensional representation of the eighth example security camera system including the support body 906/camera subsystem 902 with the support body being removed (at 920) and flipped 90° (at 910) to change to a wall mount.

Figure 9C:
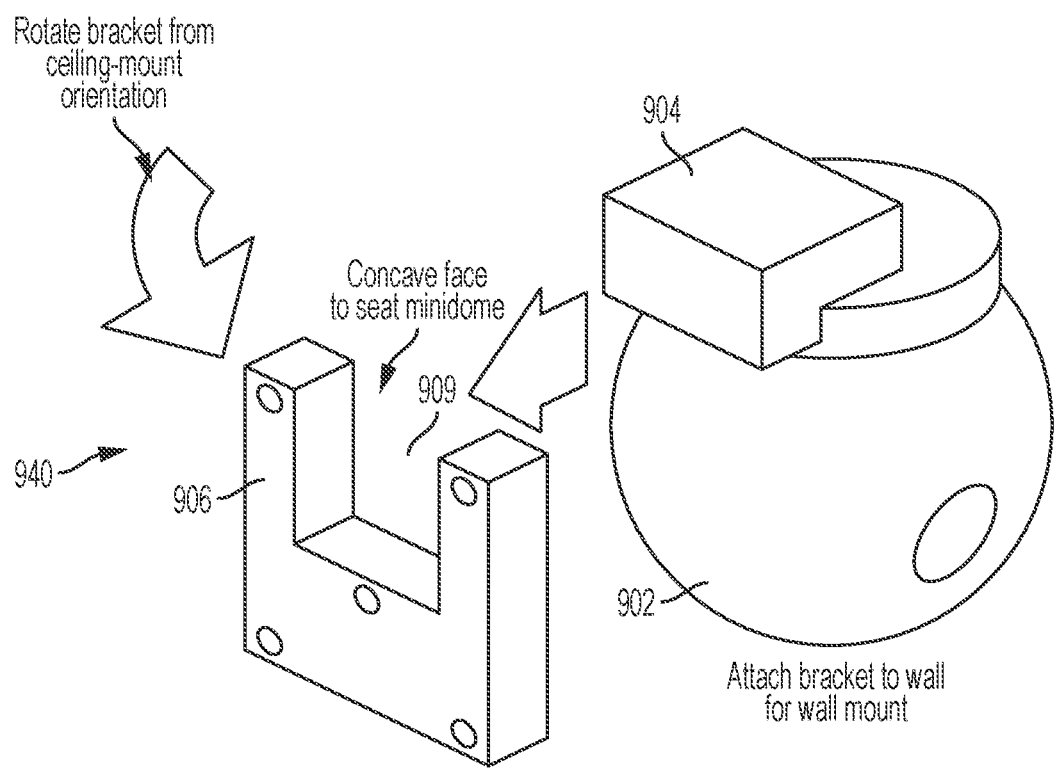
FIG. 9C is a 3-dimensional representation of the eighth example security camera system including the support body/camera subsystem with the mating piece of the camera subsystem being inserted into the support body, previously being flipped 90° to change to the wall mount.
Figure 9D:
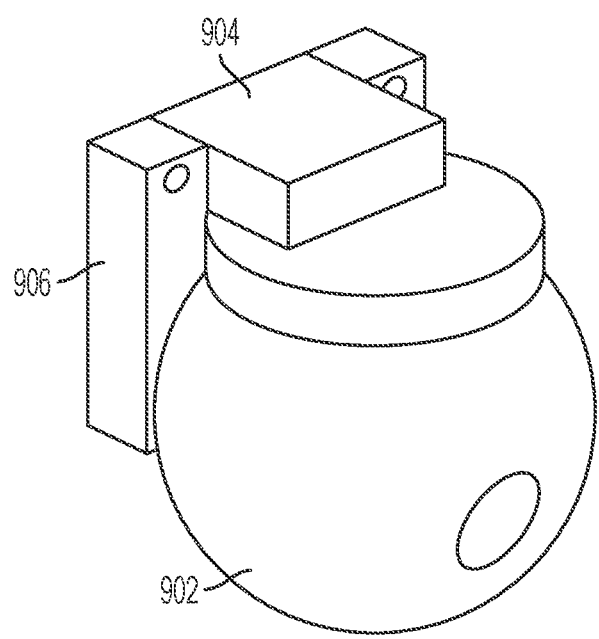
FIG. 9D is a 3-dimensional representation of an eighth example security camera system including the support body/camera subsystem mounted to the wall.

FIG. 9C is a 3-dimensional representation of the eighth example security camera system including the support body 906/camera subsystem 902 with mating piece 904 of the camera subsystem 902 being inserted into the inset 909 of the support body 906, previously being flipped 90° (at 940) to change to the wall mount. Though not illustrating a face of support body 906, which contacts the camera subsystem 902 may be concave in order to seat the spherical portion of the camera subsystem 902. FIG. 9D is a 3-dimensional representation of an eighth example security camera system including the support body 906/camera subsystem 902 mounted to the wall.

Figure 9E:
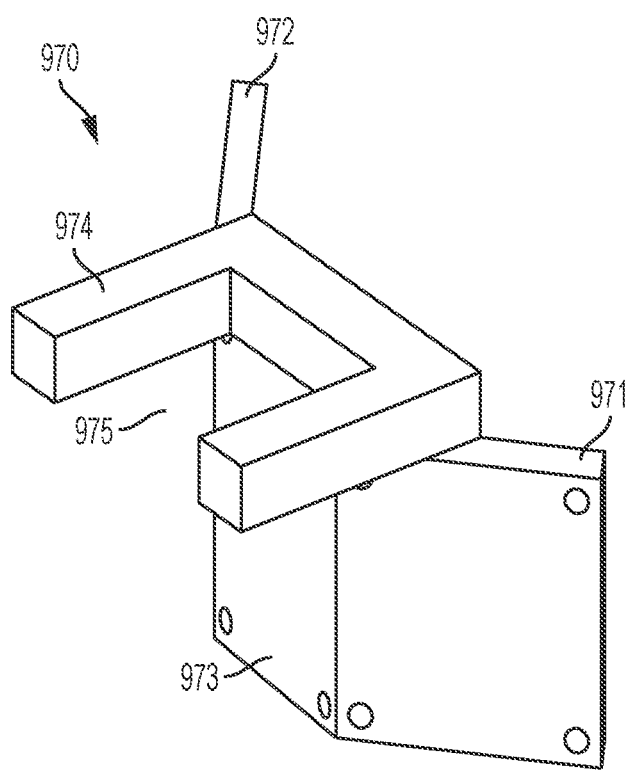
FIG. 9E is a 3-dimensional representation of a first example of a supporting bracket for a corner mount.
Figure 9F:
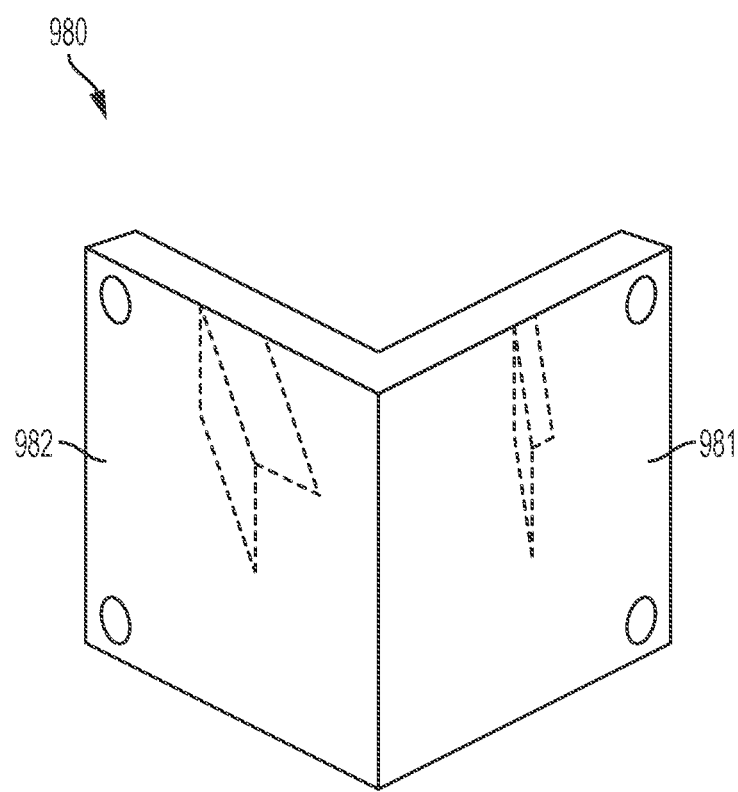
FIG. 9F is a 3-dimensional representation of a second example of a supporting bracket for a corner mount.

FIG. 9E is a 3-dimensional representation of a first example of a supporting bracket 970 for corner mounting. Specifically, supporting bracket 970 may include one or more sides 971, 972, 973, one, some or all are connected to U-shaped piece 974. Sides 971, 973 may connect to the two walls of the corner. As shown, U-shaped piece 974 includes inset 975, which may mate with mating piece 904. FIG. 9F is a 3-dimensional representation of a second example of a supporting bracket 980 for the eighth example. As illustrated, sides 981, 982 of the supporting bracket 980 may seat in the corner of room.

Figure 10A:
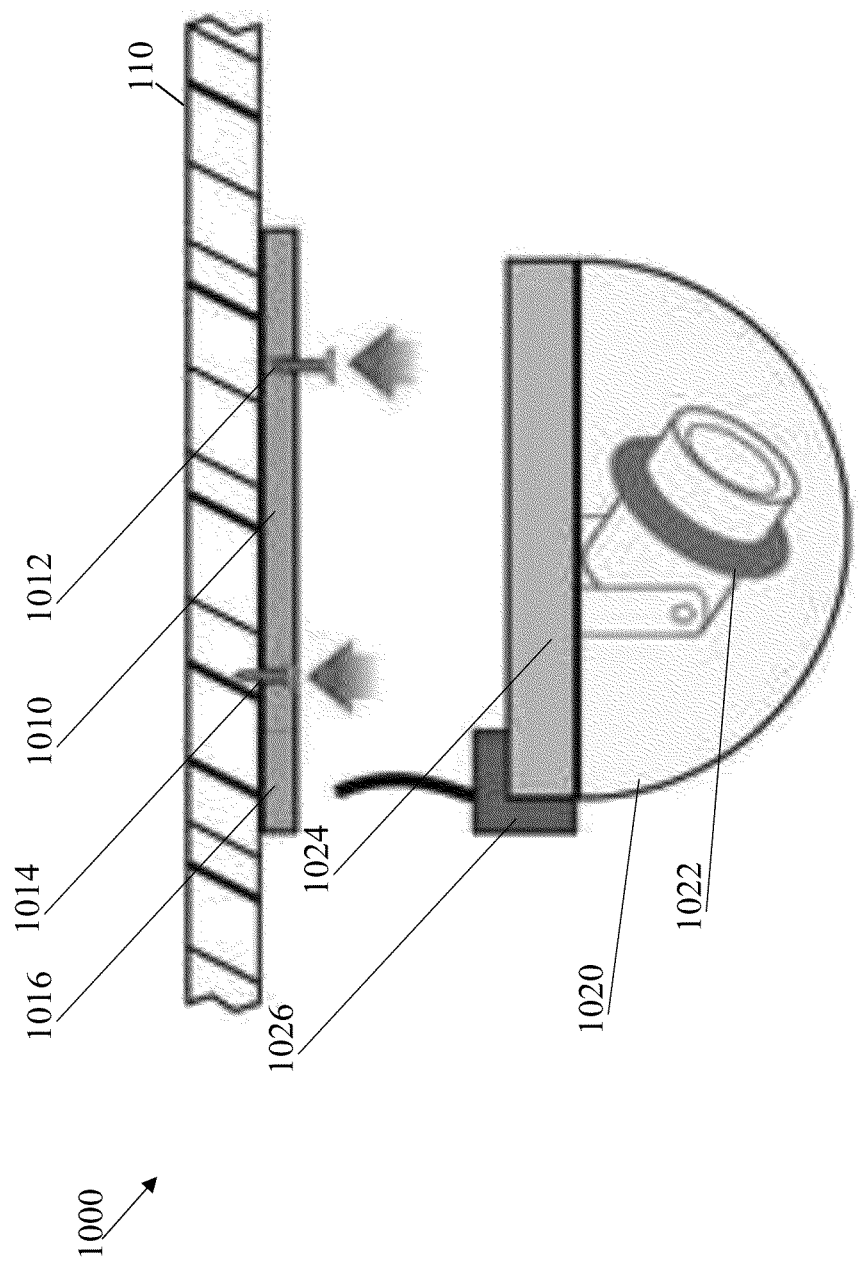
FIG. 10A is a representation of a ninth example security camera system including the support body/camera subsystem, with the support body being mounted to the ceiling.

FIG. 10A is a representation of a ninth example security camera system including the support body 1010/camera subsystem 1020, with the support body 1010 being mounted to the ceiling 110. The support body 1010, which may comprise a mounting plate, may be screwed, such as via screws 1012, 1014, to ceiling 110, with the receiver hole 1016 aligned to the camera viewing direction.

Figure 10B:
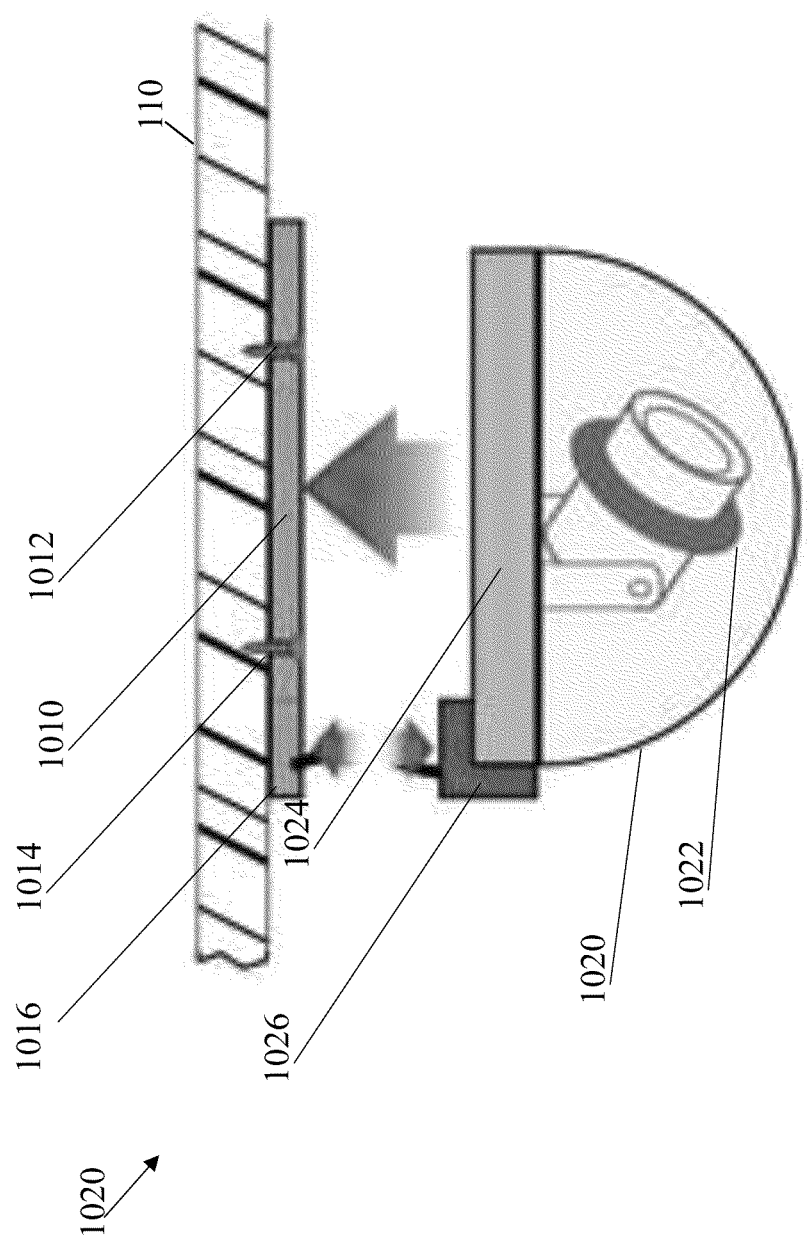
FIG. 10B is a representation of the ninth example security camera system including the support body/camera subsystem, with the camera subsystem being mounted to the support body (which is mounted to the ceiling).

FIG. 10B is a representation of the ninth example security camera system including the support body 1012/camera subsystem 1022, with the camera subsystem 1022 being mounted to the support body 1010 (which is mounted to the ceiling 110). The camera wire may be run as needed. Further, portion 1026, which may comprise a male connector, of camera subsystem 1022, may be aligned with receiver hole 1016.

Figure 10C:
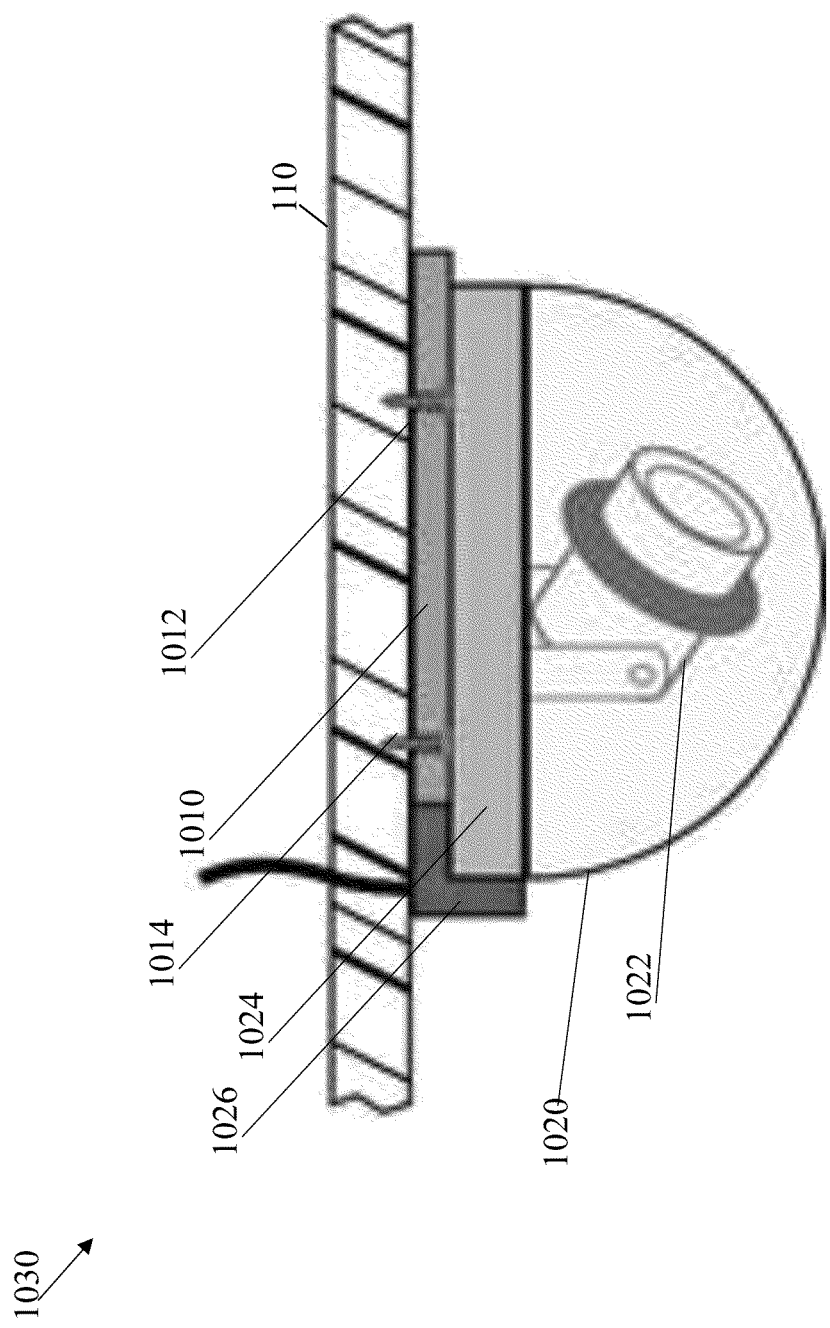
FIG. 10C is a representation of the ninth example security camera system including the support body/camera subsystem mounted to the ceiling.

FIG. 10C is a representation of the ninth example security camera system including the support body 1012/camera subsystem 1020 mounted to the ceiling 110. A surface 1024 of camera subsystem 1020 is installed flush with support body 1010, so that portion 1026 seat in receiver hole 1016. In this way, camera 1022 of camera subsystem 1020 may be positioned.

Figure 11A:
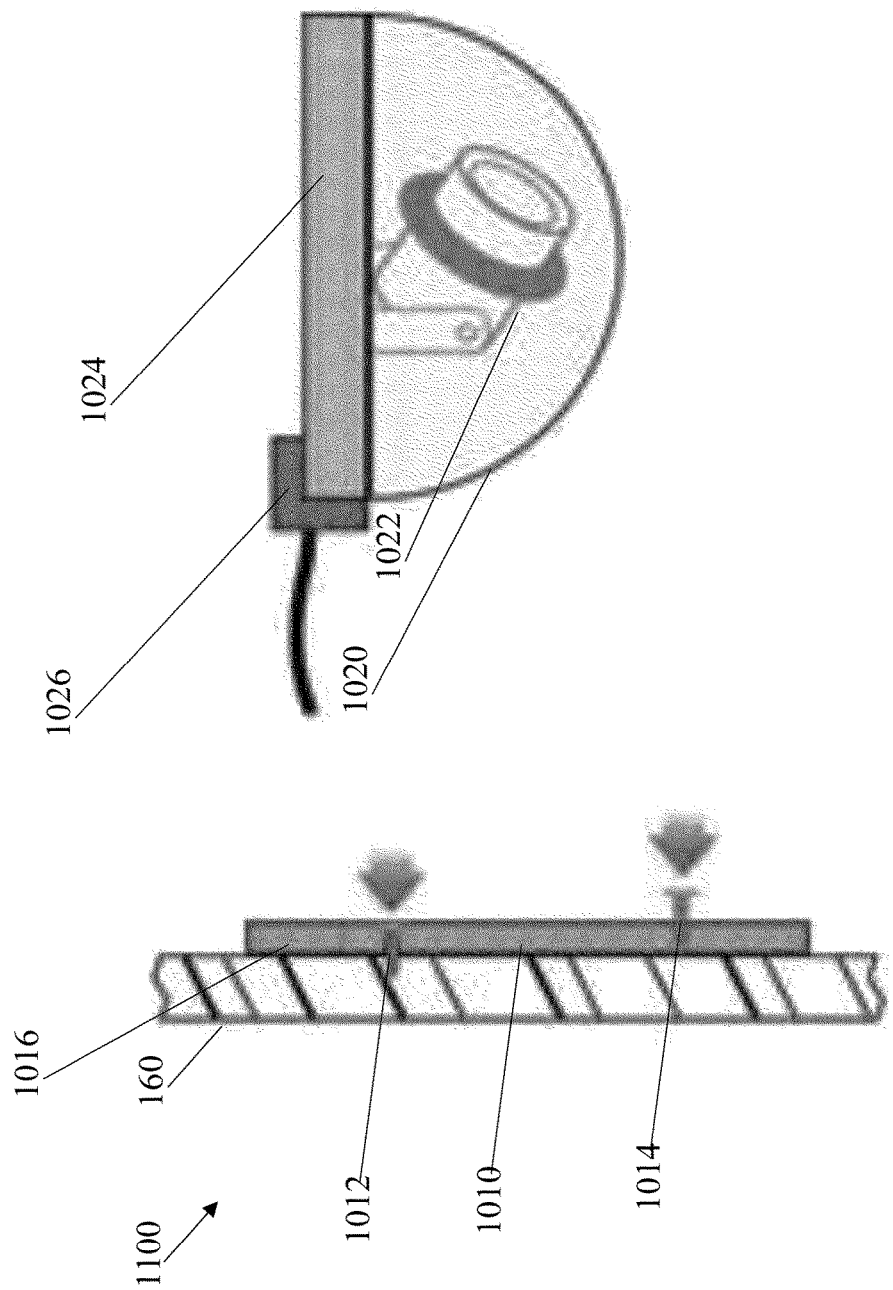
FIG. 11A is a representation of the ninth example security camera system including the support body/camera subsystem, with the support body being mounted to the wall.

FIG. 11A is a representation of the ninth example security camera system including the support body 1010/camera subsystem 1020, with the support body 1010 being mounted to the wall 160 in configuration 1100. As shown, the orientation for support body 1010 may be flipped so that receiver hole 1016 is lined up with portion 1026. In particular, the support body 1010 is screwed into wall 160 with screws 1012, 1014 so that receiver hole 1016 is at the top.

Figure 11B:
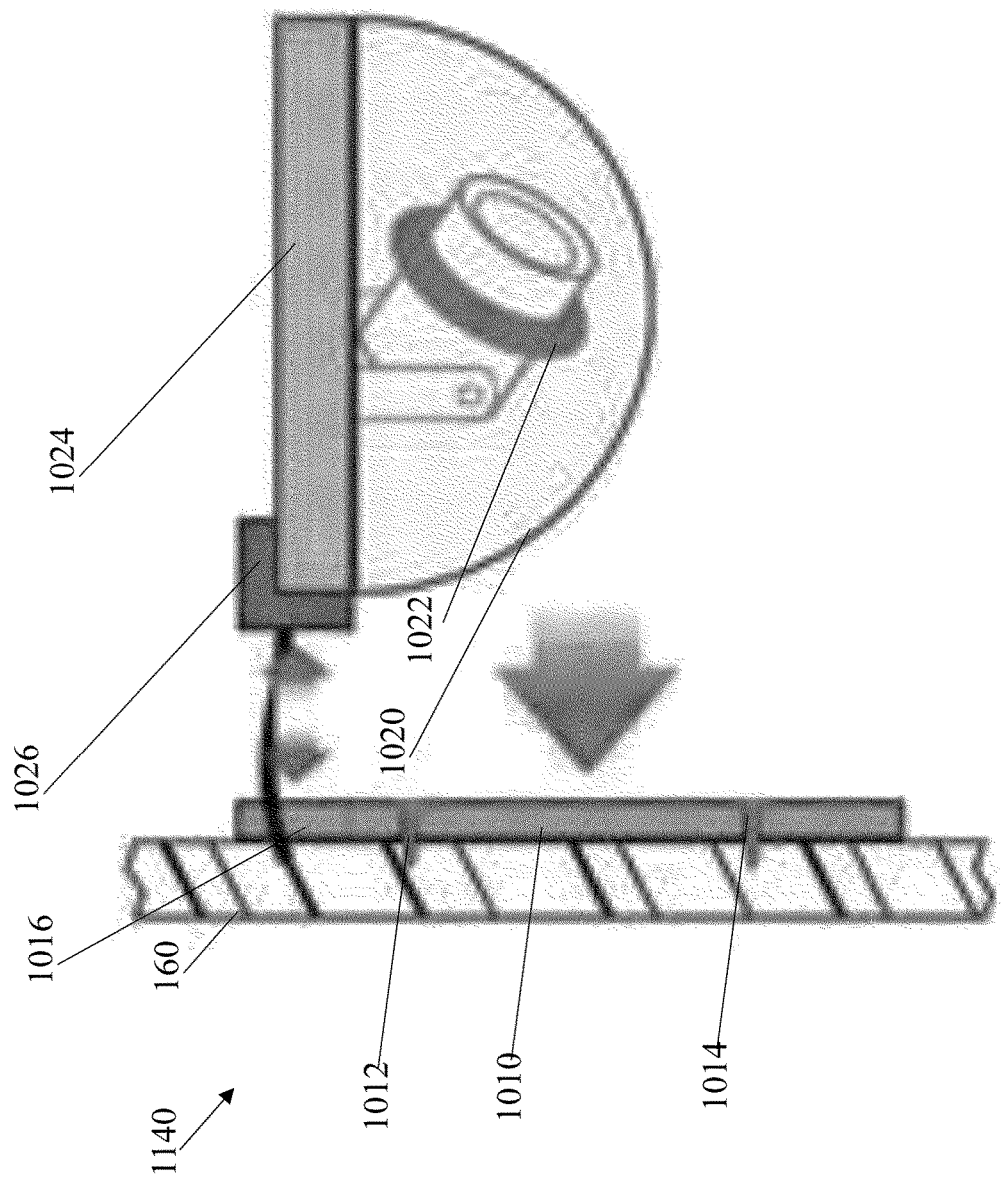
FIG. 11B is a representation of the ninth example security camera system including the support body/camera subsystem, with the camera subsystem being mounted to the support body (which is mounted to the wall).

FIG. 11B is a representation of the ninth example security camera system including the support body 1010/camera subsystem 1020, with the camera subsystem 1020 being mounted to the support body 1010 (which is mounted to the wall 160). The camera wire may be run as needed. Further, portion 1026 of camera subsystem 1022, may be aligned with receiver hole 1016.

Figure 11C:
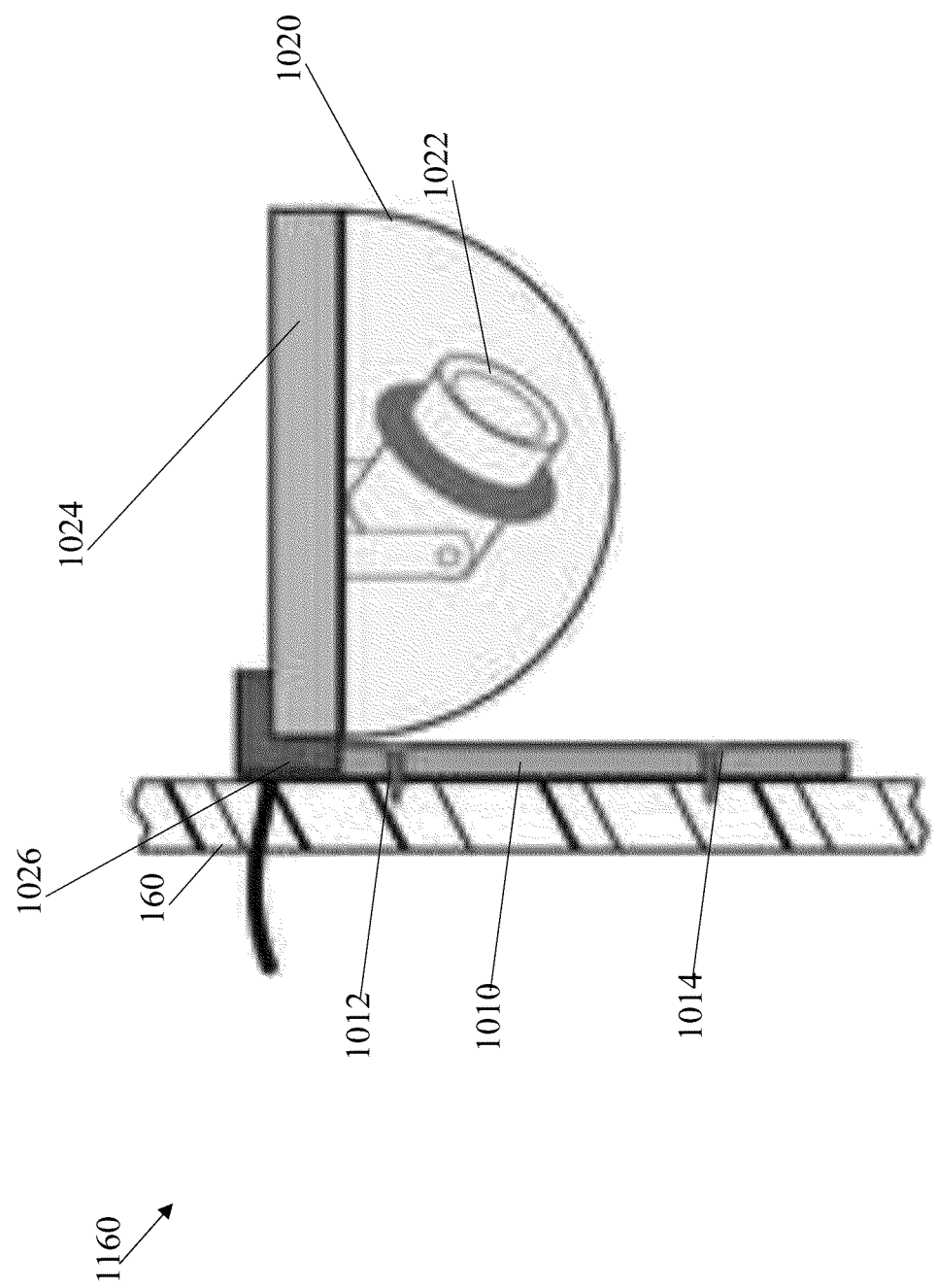
FIG. 11C is a representation of the ninth example security camera system including the support body/camera subsystem mounted to the wall.

FIG. 11C is a representation of the ninth example security camera system including the support body 1010/camera subsystem 1020 mounted to the wall 160. Camera subsystem 1020 is installed flush with support body 1010, so that portion 1026 seat in receiver hole 1016. In this way, camera 1022 of camera subsystem 1020 may be positioned.

Figure 12A:
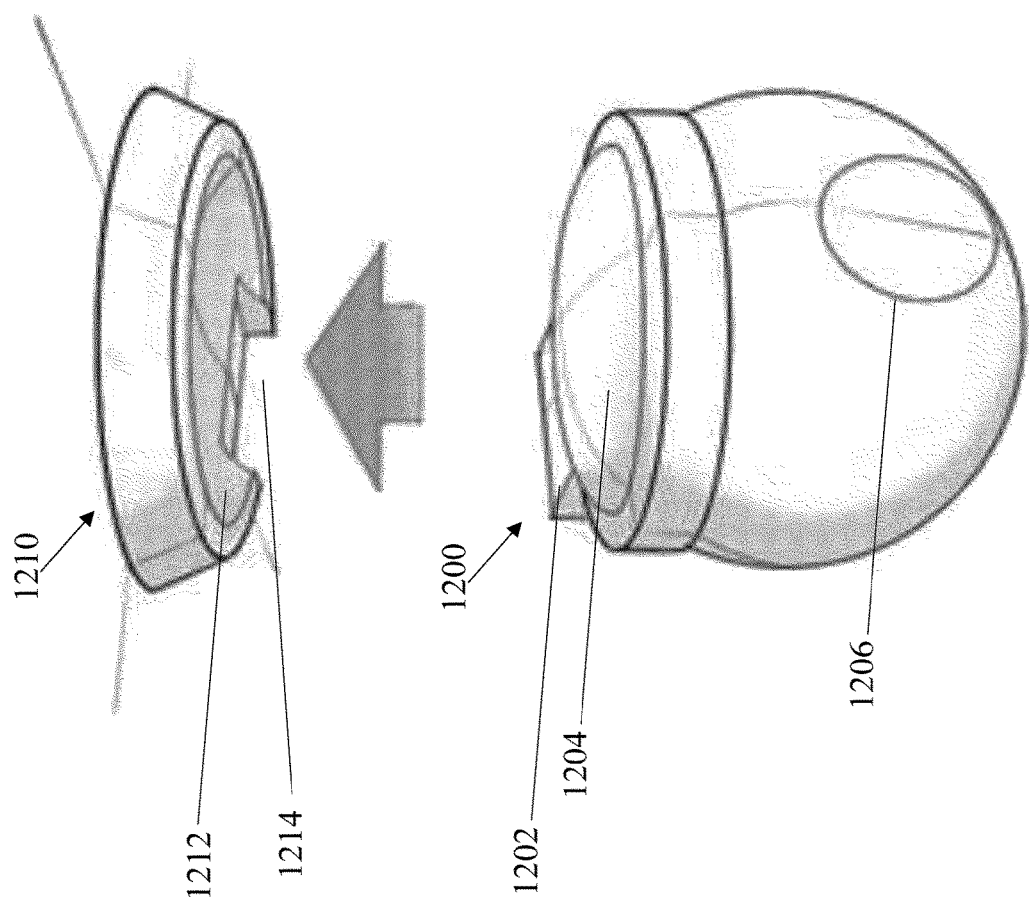
FIG. 12A is a representation of a tenth example security camera system including the support body/camera subsystem, with the camera subsystem being mounted to the support body (which is mounted to the ceiling).

FIG. 12A is a representation of a tenth example security camera system including the support body 1210/camera subsystem 1200, with the camera subsystem being mounted to the support body 1210 (which is mounted to the ceiling 110). An underside 1212 (opposite the side attached to the ceiling 110) of support body 1210 may comprise an inset 1214 configured to receive a protrusion 1202. Further, underside 1212 may have a curved surface configured to mate with a rounded upper side 1204 of camera subsystem 1200.

Figure 12B:
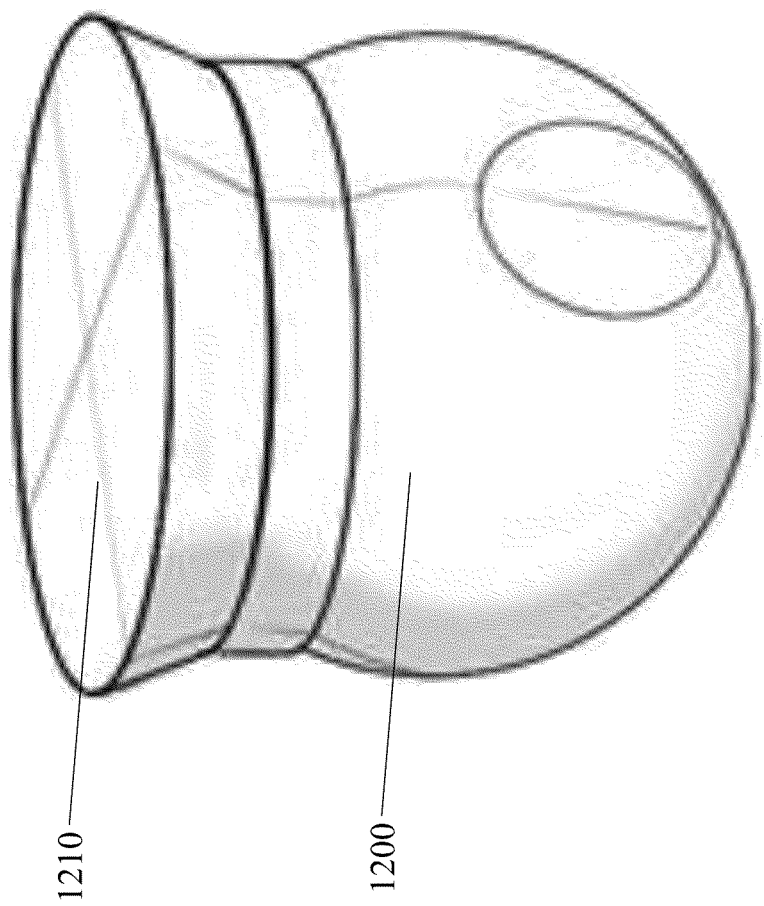
FIG. 12B is a representation of the tenth example security camera system including the support body/camera subsystem mounted to the ceiling.

FIG. 12B is a representation of the tenth example security camera system including the support body 1210/camera subsystem 1200 mounted to the ceiling 110 for configuration of camera 1206.

Figure 13A:
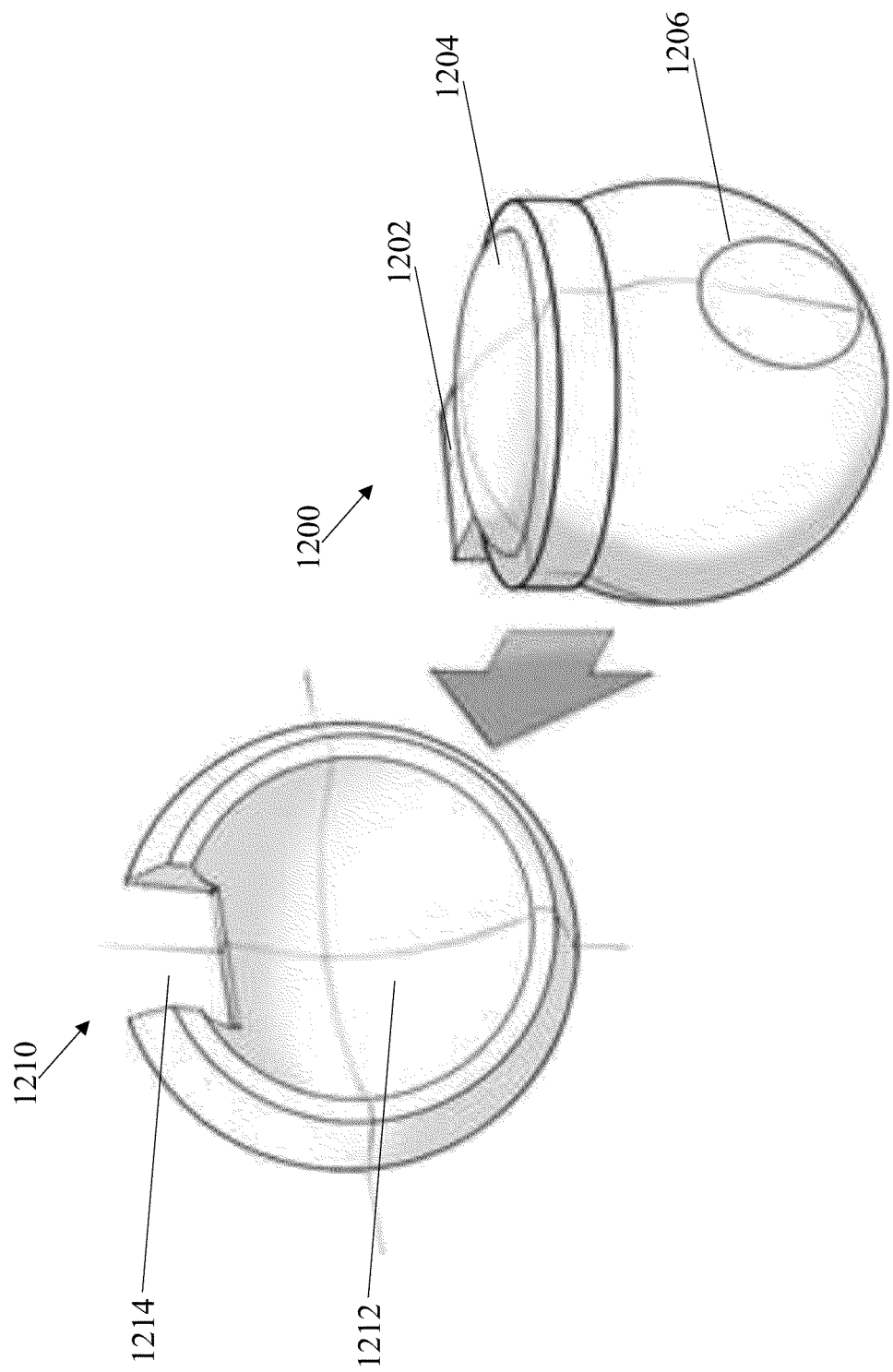
FIG. 13A is a representation of the tenth example security camera system including the support body/camera subsystem, with the camera system being mounted to the support body (which is mounted to the wall).
Figure 13B:
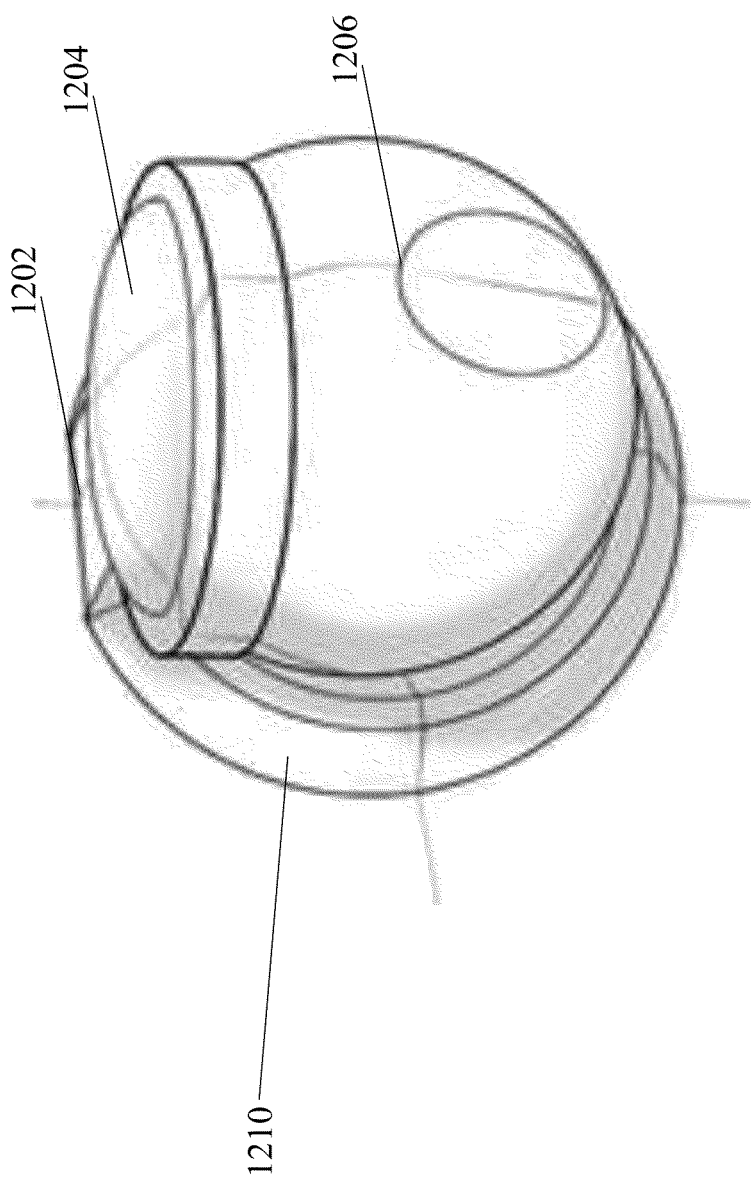
FIG. 13B is a representation of the tenth example security camera system including the support body/camera subsystem mounted to the wall.

FIG. 13A is a representation of the tenth example security camera system including the support body 1210/camera subsystem 1200, with the camera subsystem 1200 being mounted to the support body 1210 (which is mounted to the wall 160). As shown, support body 1210 is flipped with inset 1214 facing toward the ceiling 110. Underside 1212, which has a curved surface, may mate with a rounded side of camera subsystem 1200. FIG. 13B is a representation of the tenth example security camera system including the support body 1210/camera subsystem 1200 mounted to the wall 160.

Figure 14A:
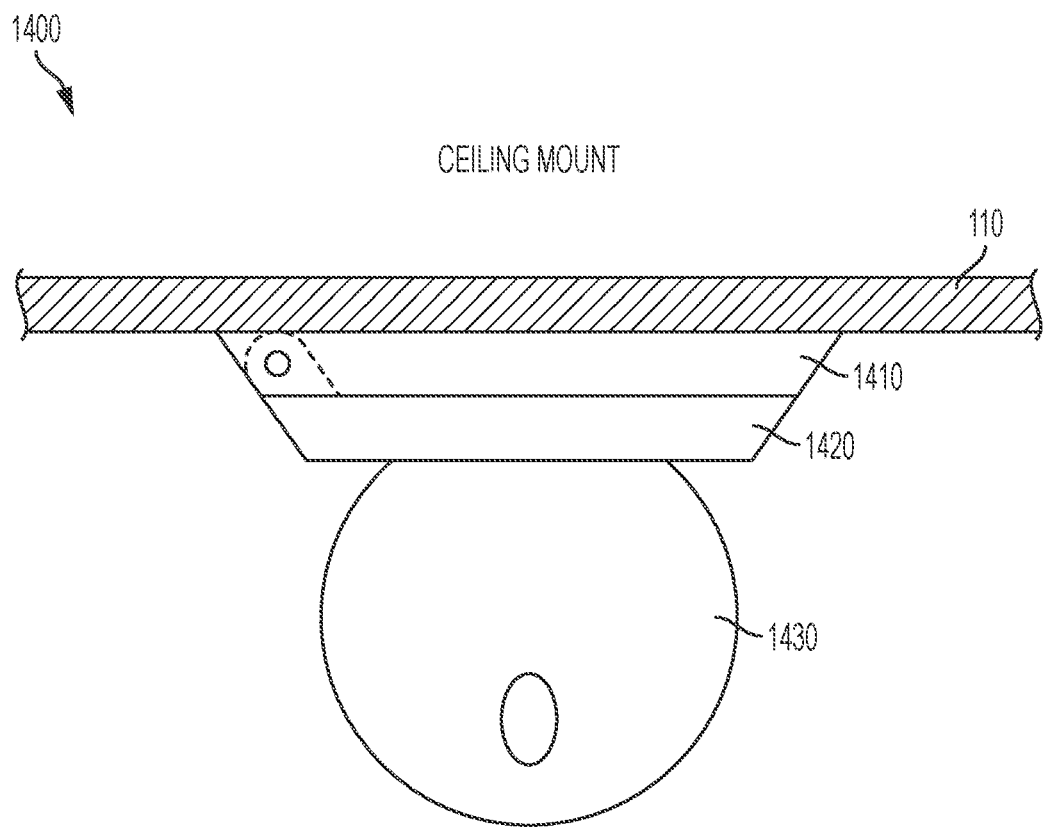
FIG. 14A is a representation of an eleventh example security camera system including the support body/camera subsystem mounted to the ceiling.

FIG. 14A is a representation of an eleventh example security camera system 1400 including the support body 1410, 1420/camera subsystem 1430 mounted to the ceiling 110. Support body 1410, 1420 may be integral with camera subsystem 1430 or may be connectable to camera subsystem 1430.

Figure 14B:
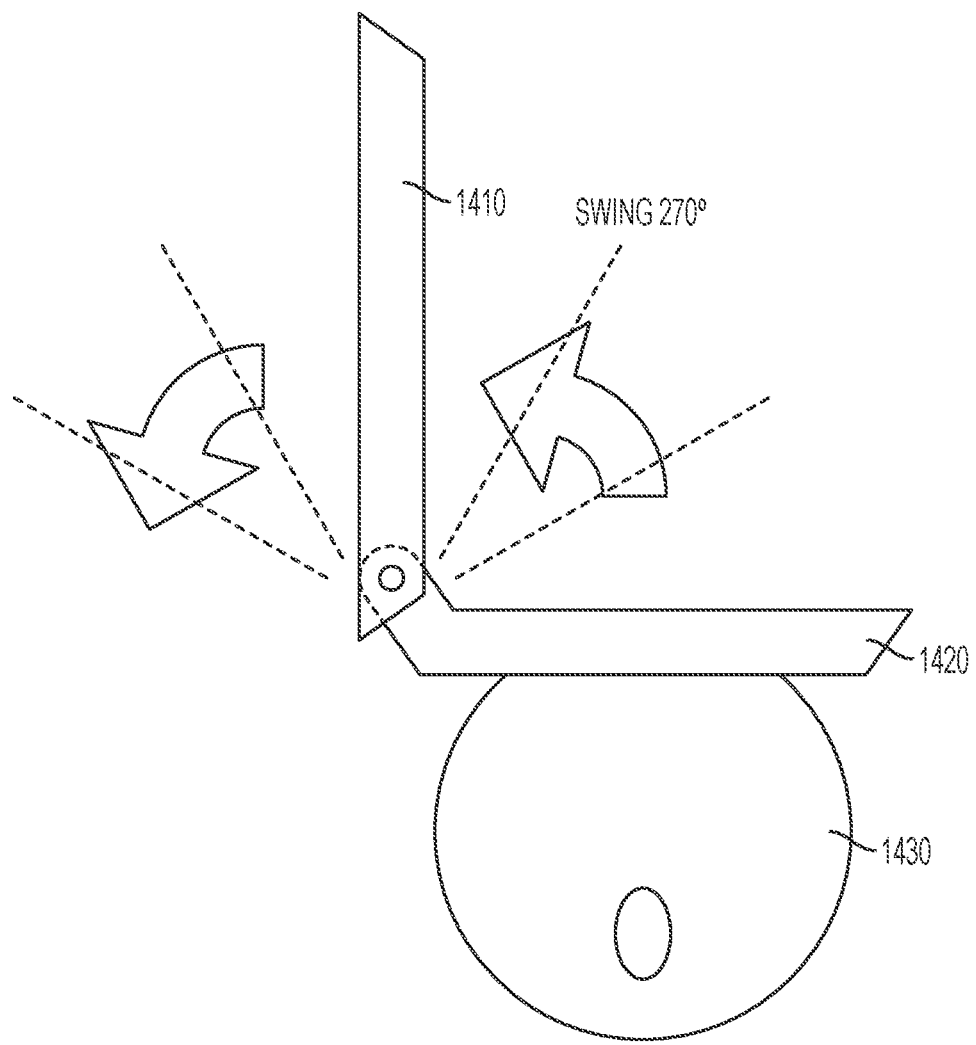
FIG. 14B is a representation of the eleventh example security camera system including the support body/camera subsystem with the supporting bracket being swung to change to a wall mount.

FIG. 14B is a representation of the eleventh example security camera system including the support body 1410, 1420/camera subsystem 1430 with the supporting bracket 1410 being swung to change to a wall mount, and camera bracket 1420 maintaining the connection with camera subsystem 1430. As shown, supporting bracket 1410 is hinged with camera bracket 1420.

Figure 14C:
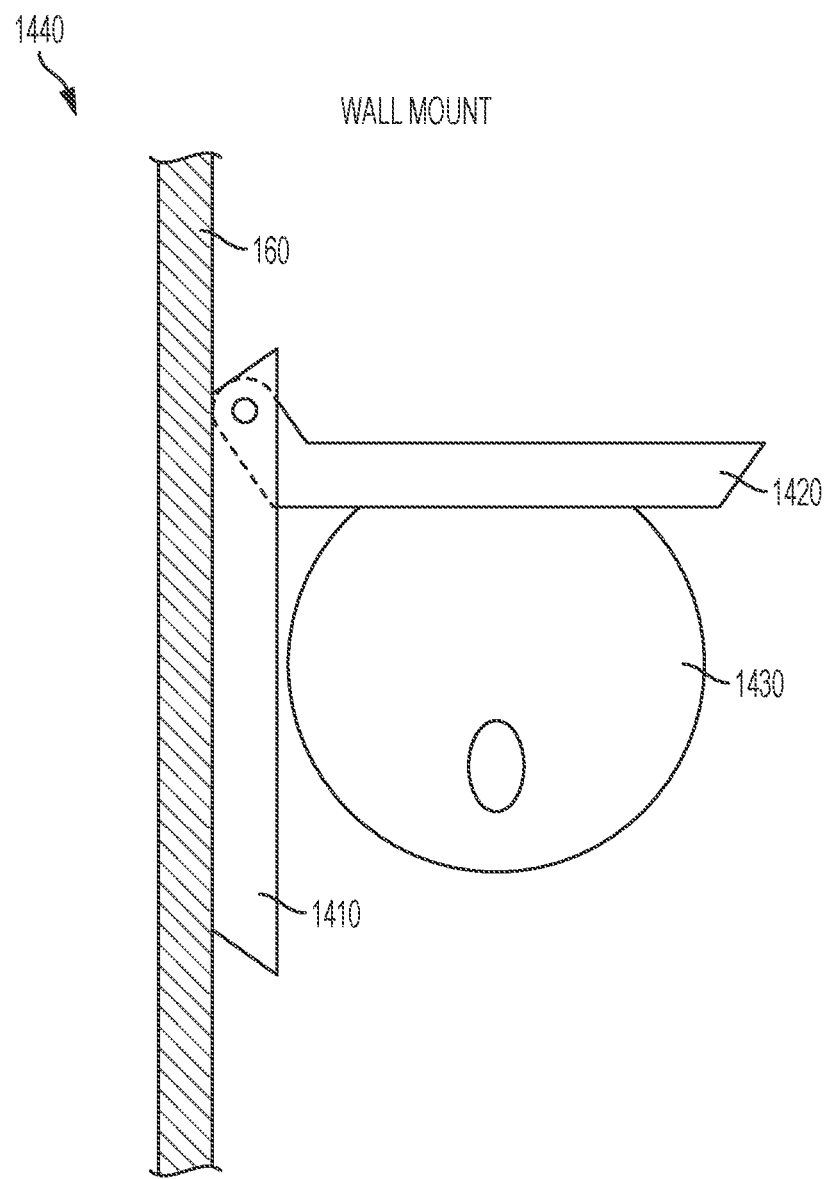
FIG. 14C is a representation of the eleventh example security camera system including the support body/camera subsystem mounted to the wall.

FIG. 14C is a representation 1440 of the eleventh example security camera system including the support body 1410, 1420/camera subsystem 1430 mounted to the wall 160, with supporting bracket 1410 being connected to wall 160.

Figure 14D:
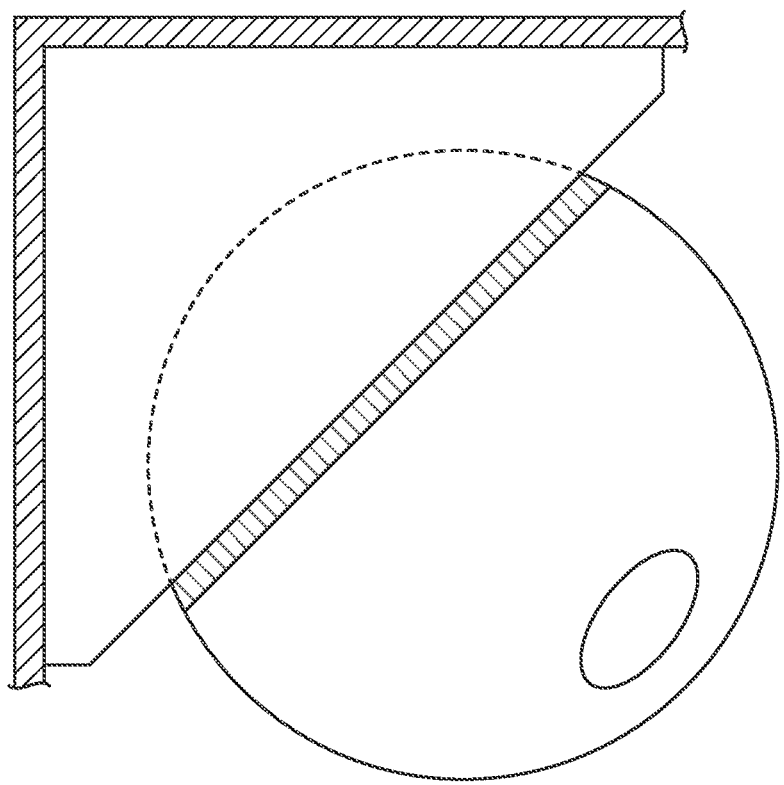
FIG. 14D is another example representation illustrating rotation (e.g., swiveling) similar to FIGS. 2, 3, 4, 6 and 7 above, rather than flipping or separating/reattaching.

FIG. 14D is another example representation 1460 illustrating rotation (e.g., swiveling) similar to FIGS. 2, 3, 4, 6 and 7 above, rather than flipping or separating/reattaching.

Figure 14E:
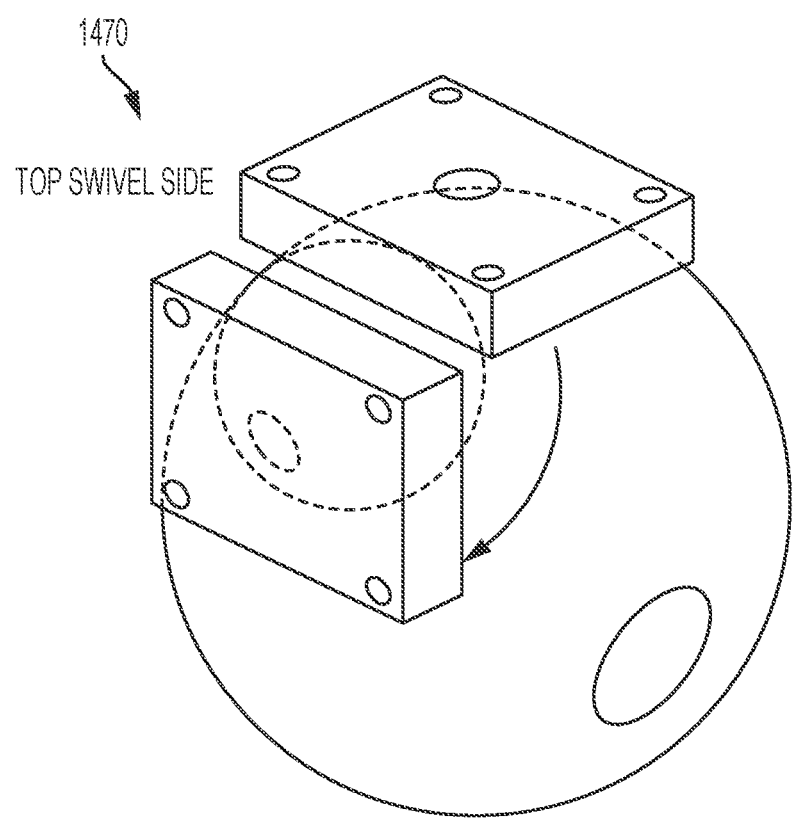
FIG. 14E is a representation of a twelfth example of a supporting bracket that is configured to swivel in order to change between a ceiling-mount configuration and a wall-mount configuration.

FIG. 14E is a representation 1470 of a twelfth example of a supporting bracket that is configured to swivel in order to change between a ceiling-mount configuration and a wall-mount configuration.

Figure 14F:
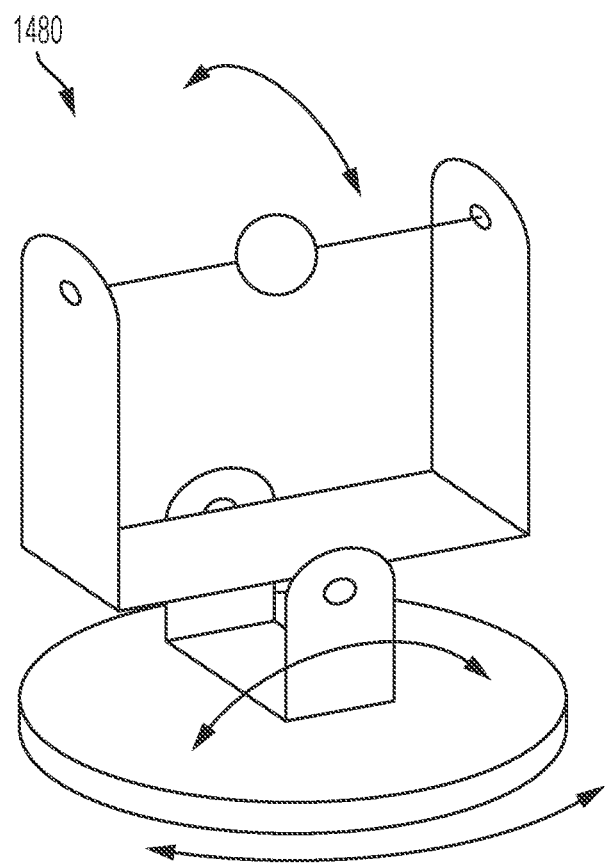
FIG. 14F is a general illustration a bracket that shows the movements of pan, tilt, and rotate operations.

FIG. 14F is a general illustration a bracket 1480 that shows the movements of pan, tilt, and rotate operations.

Figure 14G:
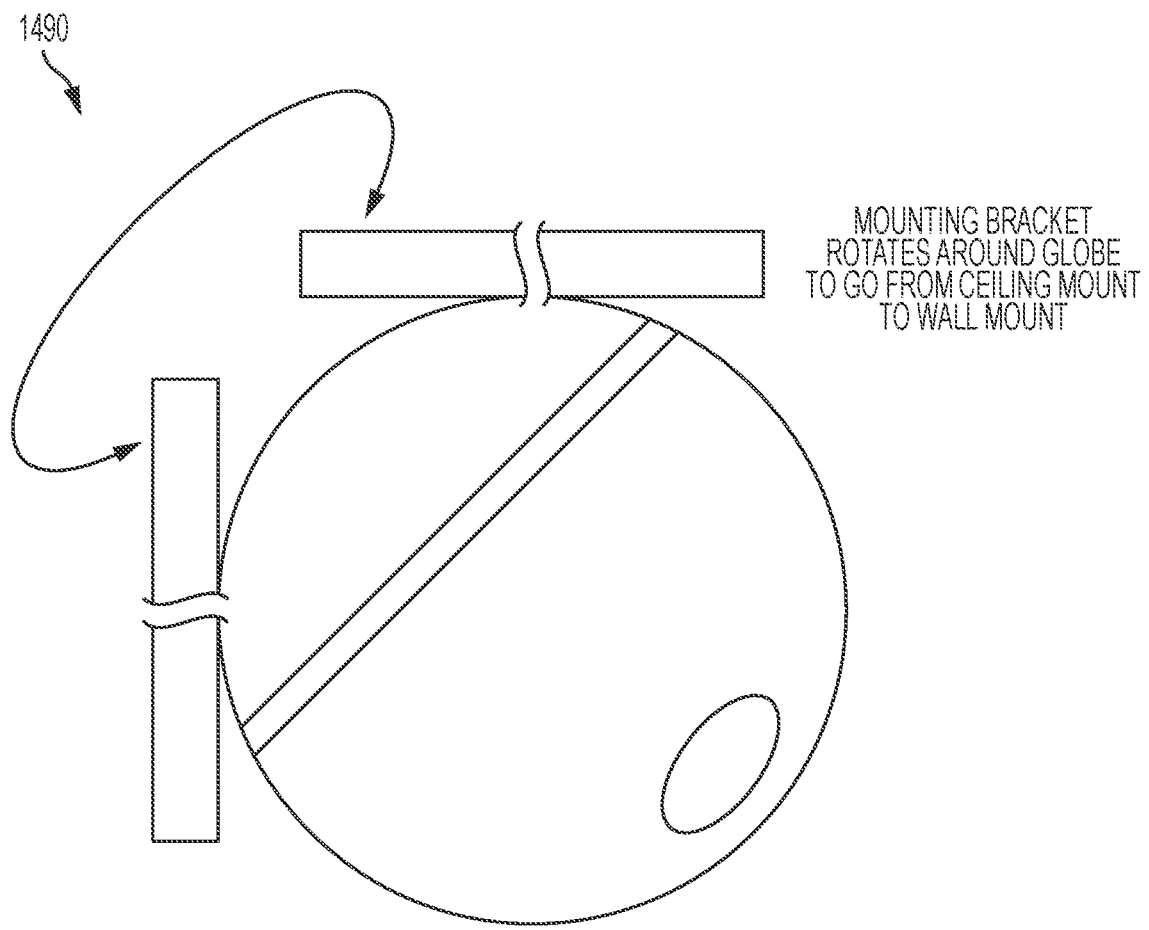
FIG. 14G is a representation of a twelfth example security camera system including the support body/camera subsystem mounted to the wall, with the support body configured to rotate around the globe camera system in order to switch from a ceiling-mount configuration and a wall-mount configuration.

FIG. 14G is a representation of a twelfth example security camera system 1490 including the support body/camera subsystem mounted to the wall, with the support body configured to rotate around the globe camera system in order to switch from a ceiling-mount configuration and a wall-mount configuration.

Figure 15A:
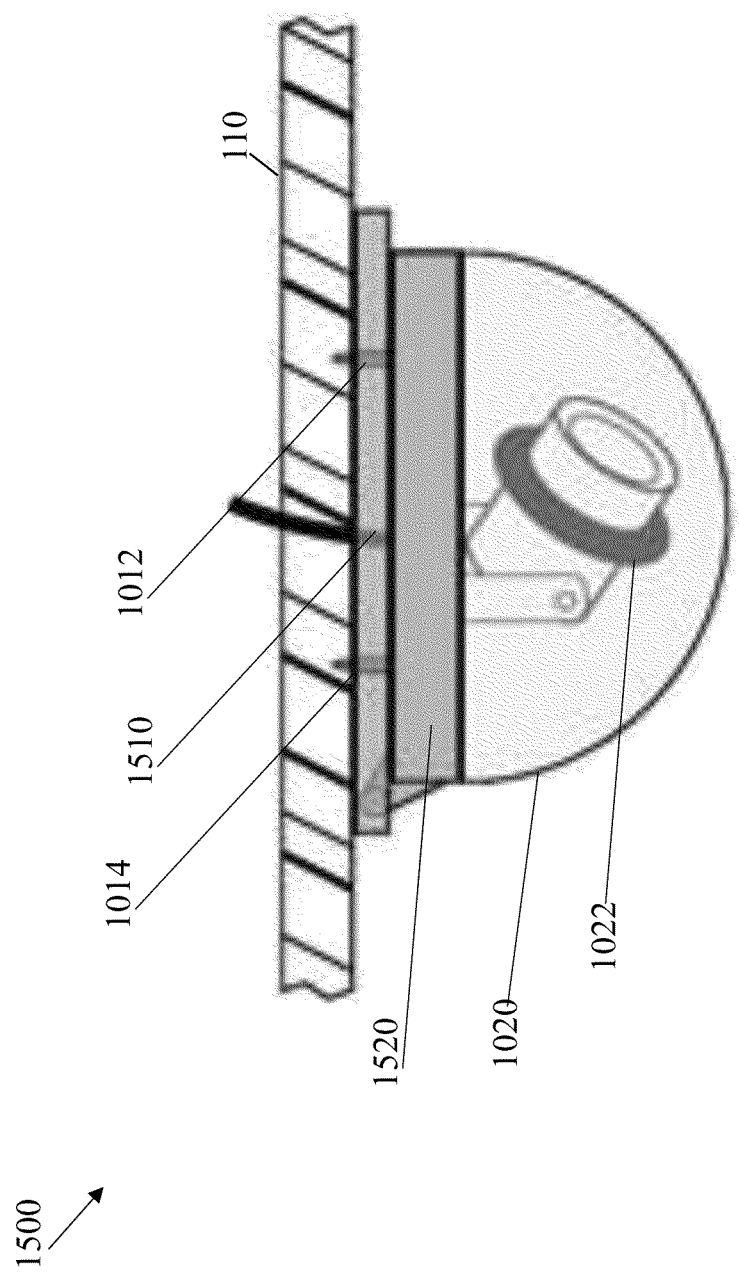
FIG. 15A is a representation of a thirteenth example security camera system including the support body/camera subsystem mounted to the ceiling.
Figure 15B:
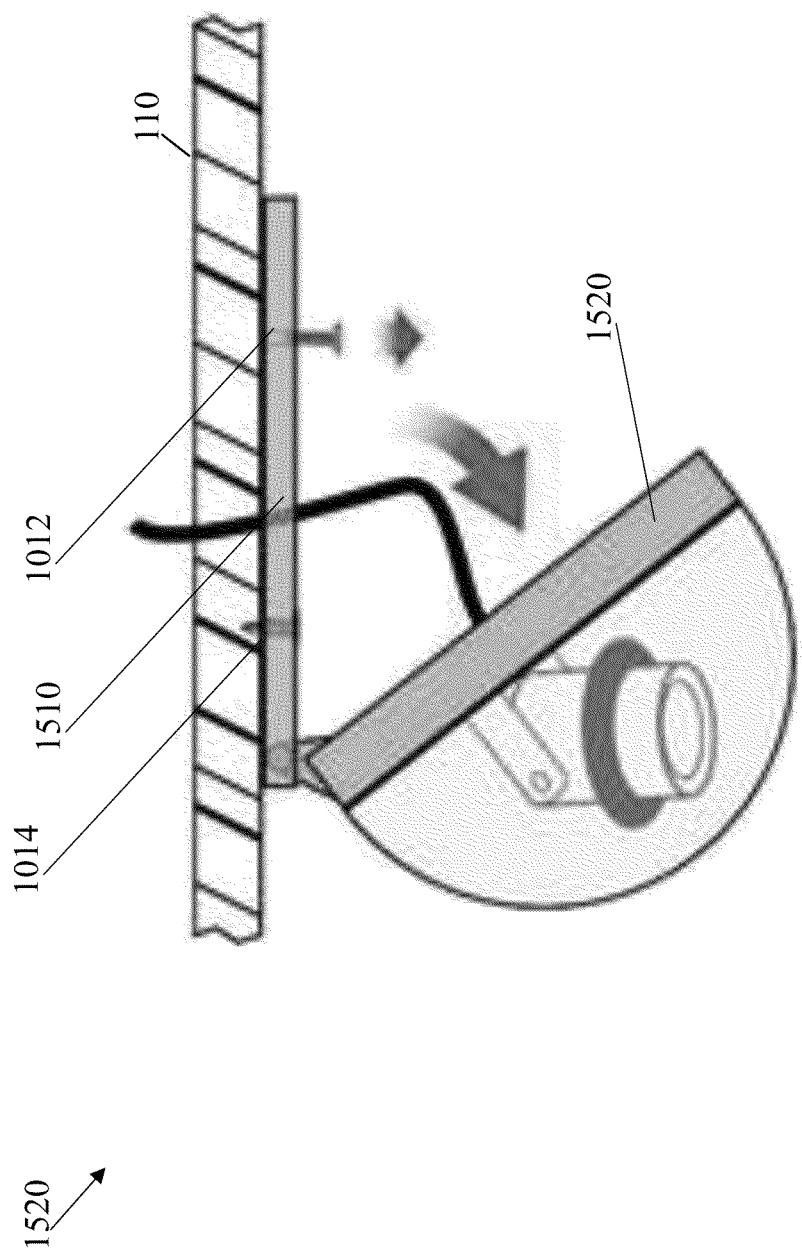
FIG. 15B is a representation of the thirteenth example security camera system including the support body/camera subsystem with the camera subsystem partially detached in preparation for changing the configuration to a wall mount.

FIG. 15A is a representation of a thirteenth example security camera system 1500 including the support body 1510, 1520/camera subsystem 1020 mounted to the ceiling 110. FIG. 15B is a representation of the thirteenth example security camera system including the support body 1510, 1520/camera subsystem 1020 with supporting bracket 1510 being swung from camera bracket 1520 thereby partially detaching camera subsystem 1020 in preparation for changing the configuration to a wall mount.

Figure 15C:
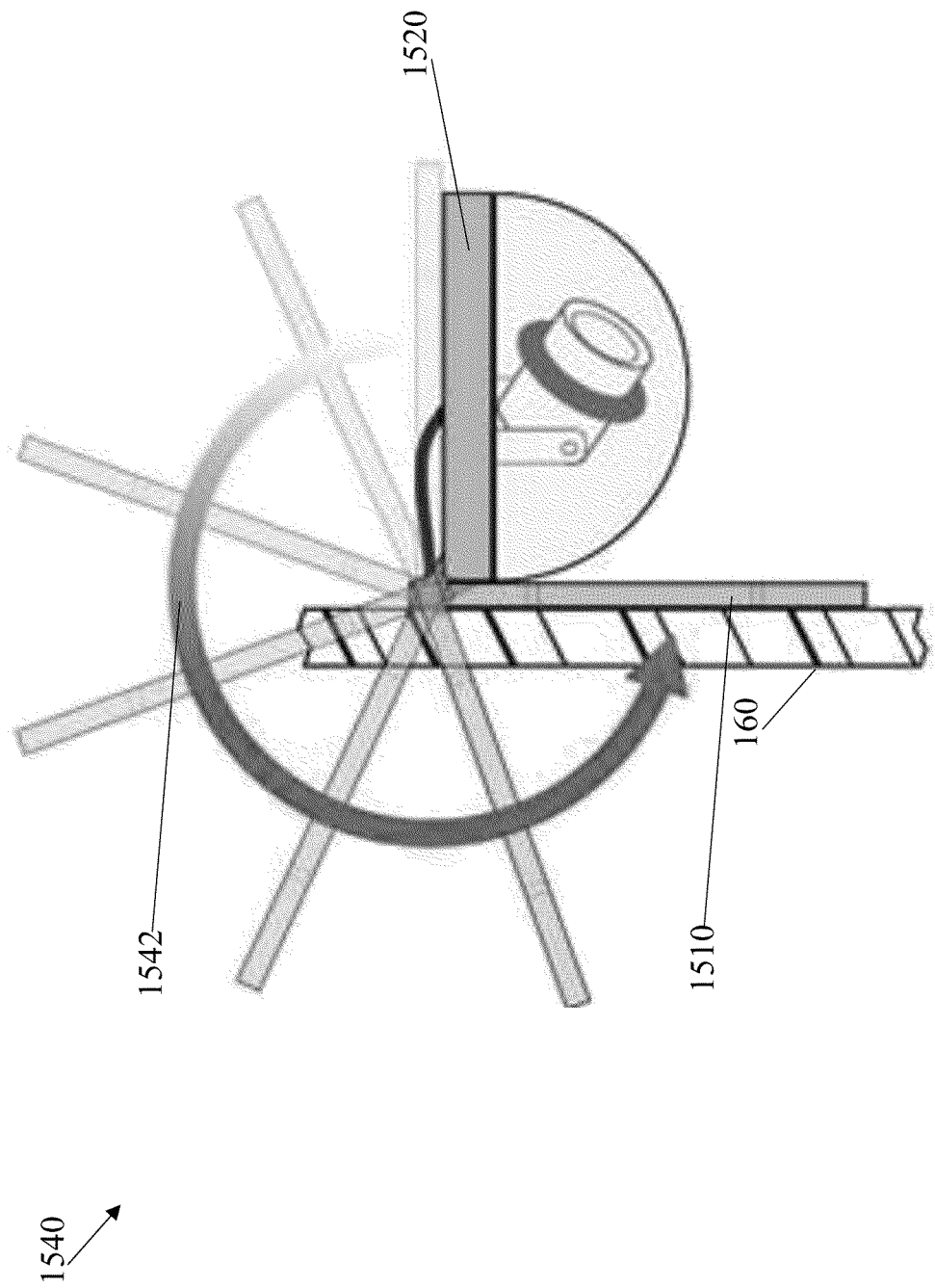
FIG. 15C is a representation of the thirteenth example security camera system including the support body/camera subsystem with the supporting bracket being swung to change to a wall mount.
Figure 15D:
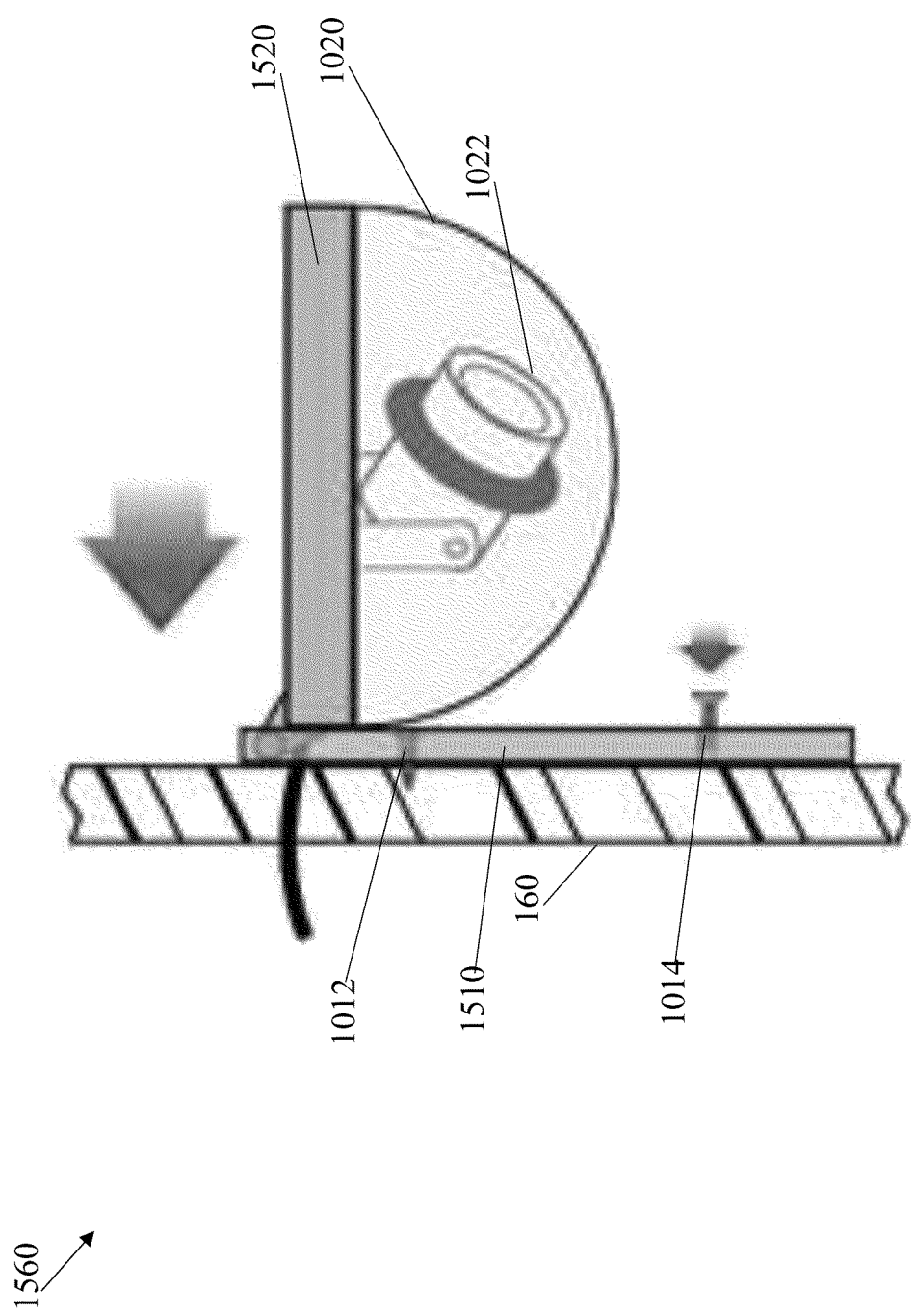
FIG. 15D is a representation of the thirteenth example security camera system including the support body/camera subsystem mounted to the wall.

FIG. 15C is a representation of the thirteenth example security camera system including the support body 1510, 1520/camera subsystem 1020 with the supporting bracket 1510 being swung 1542 to change to a wall mount. Specifically, supporting bracket 1510 is rotated to align with the wall, such as rotated 270°. FIG. 15D is a representation of the thirteenth example security camera system including the support body 1510, 1520/camera subsystem 1020 mounted to the wall. In particular, supporting bracket 1510 is affixed to wall 160 with screws 1012, 1014.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the examples provided without departing from the scope of the present disclosure.

What is claimed is:

1. A camera system comprising:
   a support body;
   a curved cap pivotably coupled with the support body, wherein the curved cap is pivotable about an axis parallel to a tilt direction, and wherein the curved cap is continuously curved between the coupling with the support body and a coupling with a camera;
   the camera coupled with the curved cap; and
   one or more motors or manual adjustment mechanism configured to control movement of the camera, wherein the movement of the camera consists of control in a pan direction and in the tilt direction,
   wherein the support body and the camera are connected by the curved cap in a ceiling-mount configuration for connection of the camera system to a ceiling and a wall-mount configuration for connection of the camera system to a wall,
   wherein the ceiling-mount configuration is different from the wall-mount configuration;
   wherein in both the ceiling-mount configuration and the wall-mount configuration, a pan axis of the camera is always in a vertical direction parallel to the wall and the curved cap is in a same orientation, and the support body and the camera are configured to rotate relative to one another about the axis parallel to the tilt direction to transition from the ceiling-mount configuration to the wall-mount configuration or vice-versa while the support body is attached to the camera; and
   wherein the camera is configured to pivotably transition from the ceiling-mount configuration to the wall-mount configuration or vice-versa with the support body attached to the camera and the system includes at least one component to prevent movement therebetween.

2. The camera system of claim 1, wherein, in both the ceiling-mount configuration and the wall-mount configuration, the camera is in the same orientation; and
   wherein, in the ceiling-mount configuration and the wall-mount configuration, the support body is in different orientations.

3. The camera system of claim 2, wherein, in the wall-mount configuration, the support body is rotated 180° and flipped relative to the orientation of the support body in the ceiling-mount configuration.

4. The camera system of claim 1, wherein the support body comprises a support body connector;
   wherein a camera subsystem comprises the camera and a camera subsystem connector;
   wherein one or both of the support body connector or the camera subsystem connector comprises a double sided connector;
   wherein, in the ceiling-mounted configuration, the support body and the camera subsystem electrically connect via a first side of the double sided connector; and
   wherein, in the wall-mounted configuration, the support body and the camera subsystem electrically connect via a second side of the double sided connector.

5. The camera system of claim 4, wherein the camera subsystem connector comprises the double sided connector.

6. The camera system of claim 1, further comprising a camera subsystem comprising the camera, a motor, and a camera subsystem connector; and
   wherein the support body comprises electronics and a support body connector, the electronics configured to control the motor.

7. The camera system of claim 6, wherein the camera subsystem includes a shaft configured to move via the motor and an arm connecting the shaft to the camera; and
   wherein the shaft is in a same orientation in both the ceiling-mount configuration and the wall-mount configuration.

8. The camera system of claim 7, wherein the shaft is always in the vertical direction.

9. The camera system of claim 1, wherein the support body comprises an inset for contact with a first type of corner and comprises one or more flat edges for contact with a second type of corner.

10. The camera system of claim 1, further comprising a camera subsystem comprising the camera and a motor or manual adjustment mechanism;
   wherein the support body comprises a first portion of the support body and a second portion of the support body;
   wherein the first portion of the support body is connected to the second portion of the support body via a hinge;
   wherein the second portion of the support body is connected to the camera subsystem; and
   wherein the first portion of the support body is configured to connect to the wall or to the ceiling.

11. The camera system of claim 1, wherein the one or more motors are configured to control movement of the camera.

12. A camera system comprising:
   a support body comprising a surface configured to connect to a wall;
   a curved member comprising at least one of a cap and an arm, the curved member pivotably coupled with the support body, wherein the curved member is pivotable about an axis parallel to a tilt direction, and wherein the curved member is continuously curved between the coupling with the support body and a coupling with a camera;
   the camera coupled with the curved member; and
   one or more motors or manual adjustment mechanism configured to control movement of the camera, wherein the movement of the camera consists of control in a pan direction and in a tilt direction and wherein the movement of the camera does not include any rotational movement,
   wherein a pan axis of the camera is always in a vertical direction parallel to the wall;
   wherein the surface of the support body is parallel to the pan axis of the camera, the support body and the camera are configured to rotate relative to one another about an axis parallel to the tilt direction to transition from a ceiling-mount configuration to a wall-mount configuration or vice-versa while the support body is attached to the camera; and
   wherein the camera is configured to pivotably transition from the ceiling-mount configuration to the wall-mount configuration or vice-versa with the support body attached to the camera and the system includes at least one component to prevent movement therebetween.

13. The camera system of claim 12, further comprising a shaft configured to move via the motor and an arm connecting the shaft to the camera;
   wherein movement of the shaft is configured to move the camera in the pan direction; and
   wherein the shaft is coaxial with the pan axis and in the vertical direction.

14. The camera system of claim 13, further comprising a belt translating motion from the motor to the shaft; and
   wherein the belt is perpendicular to the wall.

15. The camera system of claim 14, wherein the camera is housed in a housing;
   wherein the arm is fixedly connected at a first end to the shaft; and
   wherein the arm is fixedly connected at a second end to the housing.

16. The camera system of claim 15, wherein the support body comprises a support body connector;
   further comprising a camera subsystem comprises the camera and a camera subsystem connector; and
   wherein one or both of the support body connector or the camera subsystem connector comprises a double sided connector.

17. The camera system of claim 16, wherein the camera subsystem connector comprises the double sided connector.

18. The camera system of claim 12, wherein the one or more motors are configured to control movement of the camera.

* * * * *